(12) United States Patent
Tural

(10) Patent No.: US 11,710,964 B2
(45) Date of Patent: Jul. 25, 2023

(54) MANAGING OFF-GRID ENERGY GENERATION AND STORAGE

(71) Applicant: Saudi Arabian Oil Company, Dhahran (SA)

(72) Inventor: Tolga Tural, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 234 days.

(21) Appl. No.: 17/120,934

(22) Filed: Dec. 14, 2020

(65) Prior Publication Data

US 2022/0190597 A1 Jun. 16, 2022

(51) Int. Cl.
| | |
|---|---|
| *H02J 3/00* | (2006.01) |
| *H02S 40/38* | (2014.01) |
| *H01M 8/04313* | (2016.01) |
| *H02J 3/32* | (2006.01) |
| *G06N 3/044* | (2023.01) |

(52) U.S. Cl.
CPC ......... *H02J 3/007* (2020.01); *H01M 8/04313* (2013.01); *H02J 3/32* (2013.01); *H02S 40/38* (2014.12); *G06N 3/044* (2023.01); *H01M 2250/402* (2013.01); *H02J 2300/24* (2020.01)

(58) Field of Classification Search
CPC .......... H02J 3/007; H02J 3/32; H02J 2300/24; H02J 3/003; H02J 3/004; H02J 2300/20; H02J 3/381; H01M 8/04313; H01M 2250/402; H02S 40/38; G06N 3/0445; Y02E 10/56; Y02E 60/50; Y02E 70/30; Y04S 10/50

USPC ........................................................ 700/295
See application file for complete search history.

(56) References Cited

U.S. PATENT DOCUMENTS

| | | |
|---|---|---|
| 9,020,649 B2 | 4/2015 | Sharma et al. |
| 2011/0140648 A1 | 6/2011 | Lee |

(Continued)

OTHER PUBLICATIONS

Hassan et al., "Fuzzy embedded MPPT modeling and control of PV system in a hybrid power system," 2016 International Conference on Emerging Technologies (ICET), IEEE, 2016, 6 pages.

(Continued)

*Primary Examiner* — Richard Tan
(74) *Attorney, Agent, or Firm* — Fish & Richardson P.C.

(57) ABSTRACT

Techniques for managing an off-grid power system include executing update requests for an off-grid power system that is communicably coupled to an energy management system by determining an amount of stored energy in energy storage devices in response to at least one update request, determining an amount of electrical power generatable by renewable energy power systems in response to another update request, determining a predicted reliability of at least a portion of the energy storage devices and the renewable energy power systems in response to another update request, and determining an amount of electrical power for a remote facility that is electrically coupled to the off-grid power system in response to another update request. The techniques further include determining a control command for the off-grid power system based on the responses to the update requests; and providing the control command to the off-grid power system to adjust an operation of at least one of the energy storage devices or the renewable energy power systems.

27 Claims, 19 Drawing Sheets

(56) References Cited

U.S. PATENT DOCUMENTS

2014/0163755 A1* 6/2014 Potter .................. G06F 1/26
                                                                                                   700/287
2015/0241896 A1   8/2015 Nishibayashi et al.
2016/0352125 A1  12/2016 Choi et al.
2018/0197254 A1* 7/2018 Yoscovich ............. H02J 3/06

OTHER PUBLICATIONS

Jiang, "Power management of hybrid photovoltaic-fuel cell power systems." 2006 IEEE Power Engineering Society General Meeting, IEEE, 2006, 6 pages.

Kumaravel et al., "Adapted multilayer feedforward ANN based power management control of solar photovoltaic and wind integrated power system," ISGT2011-India. IEEE, 2011, 6 pages.

Raju et al., "Artificial intelligence based battery power management for solar PV and wind hybrid power system." International Journal of Engineering Research and General Science 1.2, 2013, 37-46, 10 pages.

Tural et al., "Short-term electrical load demand forecasting using artificial neural networks for off-grid distributed generation applications." 2017 Saudi Arabia Smart Grid (SASG). IEEE, 2017, 7 pages.

PCT International Search Report and Written Opinion in International Appln. No. PCT/US2021/063199, dated Apr. 4, 2022, 13 pages.

* cited by examiner

MANAGING OFF-GRID ENERGY GENERATION AND STORAGE

TECHNICAL FIELD

The present disclosure describes systems and methods for managing off-grid energy generation and storage and, more particularly, energy management systems and methods that implement artificial intelligence and other algorithms to reliably provide off-grid electrical power to remote locations.

BACKGROUND

Power generation and storage for remote locations, such as locations decoupled from a power distribution and transmission grid, often have an unreliable power supply. For example, an amount of off-grid electrical power generated may not be enough to fulfill an amount of needed electrical power for the remote location during certain time periods. If an amount of stored electrical power is not managed properly, the remote location may not have sufficient power to operate.

SUMMARY

This disclosure describes implementations of an energy management system for an off-grid power system. In some aspects, the energy management system operates to maximize an energy use of a limited energy supply provided by the off-grid power system by, for example, efficiently charging energy storage devices while applying power curtailing and load shifting for higher operational reliability and life-cycle cost reduction for the off-grid power system. In some aspects, the energy management system may utilize multiple, integrated modules to efficiently control the operation of the off-grid power system.

In an example implementation, a computer-implemented method for managing an off-grid power system includes executing, with one or more hardware processors of an energy management system, a plurality of update requests for an off-grid power system that is communicably coupled to the energy management system. The executing includes determining, with the one or more hardware processors, an amount of stored energy in one or more energy storage devices of the off-grid power system in response to at least one of the plurality of update requests, determining, with the one or more hardware processors, an amount of electrical power generatable by one or more renewable energy power systems of the off-grid power system in response to at least another of the plurality of update requests, determining, with the one or more hardware processors, a predicted reliability of at least a portion of the one or more energy storage devices and the one or more renewable energy power systems in response to at least another of the plurality of update requests, and determining, with the one or more hardware processors, an amount of electrical power for a remote facility that is electrically coupled to the off-grid power system in response to at least another of the plurality of update requests. The method further includes determining, with the one or more hardware processors, at least one control command for the off-grid power system based on the responses to the plurality of update requests; and providing, with the one or more hardware processors, the at least one control command to the off-grid power system to adjust an operation of at least one of the one or more energy storage devices or the one or more renewable energy power systems.

In an aspect combinable with the example implementation, determining the amount of stored energy in one or more energy storage devices includes determining, with the one or more hardware processors, a charge-discharge status of the one or more energy storage devices; determining, with the one or more hardware processors, a state-of-charge status of the one or more energy storage devices; and providing, with the one or more hardware processors, the at least one control command that is based in part on at least one of the charge-discharge status or the state-of-charge status.

In another aspect combinable with any of the previous aspects, determining the amount of electrical power generatable by one or more renewable energy power systems includes determining, with the one or more hardware processors, an amount of electrical power generatable by at least one photovoltaic (PV) power system of the off-grid power system; determining, with the one or more hardware processors, an amount of electrical power generatable by at least one fuel cell assembly of the off-grid power system; combining, with the one or more hardware processors, the determined amounts of electrical power by the at least one PV power system and the at least one fuel cell assembly; and providing, with the one or more hardware processors, the at least one control command that is based in part on the combined determined amounts of electrical power.

In another aspect combinable with any of the previous aspects, the at least one control command includes at least one instruction to operate at least one charger that is electrically coupled to the one or more energy storage devices to charge the one or more energy storage devices with at least one of the amount of electrical power generatable by the at least one PV power system or the amount of electrical power generatable by the at least one fuel cell assembly.

In another aspect combinable with any of the previous aspects, determining the predicted reliability of the portion of the one or more energy storage devices and the one or more renewable energy power systems includes determining, with the one or more hardware processors, an equipment health status of the at least one PV power system; determining, with the one or more hardware processors, an equipment health status of the at least one fuel cell assembly; and determining, with the one or more hardware processors, an equipment health status of the one or more energy storage devices.

Another aspect combinable with any of the previous aspects further includes determining, with the one or more hardware processors, the combined determined amounts of electrical power based at least in part on the determined equipment health statuses.

In another aspect combinable with any of the previous aspects, determining the amount of electrical power for the remote facility that is electrically coupled to the off-grid power system includes determining, with the one or more hardware processors, a low frequency electrical demand load for the remote facility; determining, with the one or more hardware processors, a high frequency electrical demand load for the remote facility; combining, with the one or more hardware processors, the determined low and high frequency electrical demand loads; and providing, with the one or more hardware processors, the at least one control command that is based in part on the combined determined low and high frequency electrical demand loads.

Another aspect combinable with any of the previous aspects further includes identifying, with the one or more hardware processors, one or more real time settings for the off-grid power system; updating, with the one or more hardware processors, one or more stored settings with the identified one or more real time settings for the off-grid power system; and changing, with the one or more hardware processors, the one or more real time settings for the off-grid power system based at least in part on the at least one control command.

In another aspect combinable with any of the previous aspects, executing the plurality of update requests for the off-grid power system includes executing, with the one or more hardware processors, at least one state machine to determine the amount of stored energy in the one or more energy storage devices, the amount of electrical power generatable by the one or more renewable energy power systems, the predicted reliability of the portion of the one or more energy storage devices and the one or more renewable energy power systems, and the amount of electrical power for the remote facility that is electrically coupled to the off-grid power system.

In another example implementation, an energy management system includes one or more memory modules; and one or more hardware processors communicably coupled to the one or more memory modules to execute one or more instructions stored on the one or more memory modules to perform operations. The operations include executing a plurality of update requests for an off-grid power system. The executing includes determining an amount of stored energy in one or more energy storage devices of the off-grid power system in response to at least one of the plurality of update requests, determining an amount of electrical power generatable by one or more renewable energy power systems of the off-grid power system in response to at least another of the plurality of update requests, determining a predicted reliability of at least a portion of the one or more energy storage devices and the one or more renewable energy power systems in response to at least another of the plurality of update requests, and determining an amount of electrical power for a remote facility that is electrically coupled to the off-grid power system in response to at least another of the plurality of update requests. The operations further include determining at least one control command for the off-grid power system based on the responses to the plurality of update requests; and providing the at least one control command to the off-grid power system to adjust an operation of at least one of the one or more energy storage devices or the one or more renewable energy power systems.

In an aspect combinable with the example implementation, the operation of determining the amount of stored energy in one or more energy storage devices includes determining a charge-discharge status of the one or more energy storage devices; determining a state-of-charge status of the one or more energy storage devices; and providing the at least one control command that is based in part on at least one of the charge-discharge status or the state-of-charge status.

In another aspect combinable with any of the previous aspects, the operation of determining the amount of electrical power generatable by one or more renewable energy power systems includes determining an amount of electrical power generatable by at least one photovoltaic (PV) power system of the off-grid power system; determining an amount of electrical power generatable by at least one fuel cell assembly of the off-grid power system; combining the determined amounts of electrical power by the at least one PV power system and the at least one fuel cell assembly; and providing the at least one control command that is based in part on the combined determined amounts of electrical power.

In another aspect combinable with any of the previous aspects, the at least one control command includes at least one instruction to operate at least one charger that is electrically coupled to the one or more energy storage devices to charge the one or more energy storage devices with at least one of the amount of electrical power generatable by the at least one PV power system or the amount of electrical power generatable by the at least one fuel cell assembly.

In another aspect combinable with any of the previous aspects, the operation of determining the predicted reliability of the portion of the one or more energy storage devices and the one or more renewable energy power systems includes determining an equipment health status of the at least one PV power system; determining an equipment health status of the at least one fuel cell assembly; and determining an equipment health status of the one or more energy storage devices.

In another aspect combinable with any of the previous aspects, the operations further include determining the combined determined amounts of electrical power based at least in part on the determined equipment health statuses.

In another aspect combinable with any of the previous aspects, the operation of determining the amount of electrical power for the remote facility that is electrically coupled to the off-grid power system includes determining a low frequency electrical demand load for the remote facility; determining a high frequency electrical demand load for the remote facility; combining the determined low and high frequency electrical demand loads; and providing the at least one control command that is based in part on the combined determined low and high frequency electrical demand loads.

In another aspect combinable with any of the previous aspects, the operations further include identifying one or more real time settings for the off-grid power system; updating one or more stored settings with the identified one or more real time settings for the off-grid power system; and changing the one or more real time settings for the off-grid power system based at least in part on the at least one control command.

In another aspect combinable with any of the previous aspects, the operation of executing the plurality of update requests for the off-grid power system includes executing at least one state machine to determine the amount of stored energy in the one or more energy storage devices, the amount of electrical power generatable by the one or more renewable energy power systems, the predicted reliability of the portion of the one or more energy storage devices and the one or more renewable energy power systems, and the amount of electrical power for the remote facility that is electrically coupled to the off-grid power system.

In another example implementation, an apparatus includes a tangible, non-transitory computer readable media configured to store instructions operable, when executed by one or more hardware processors, to perform operations including executing a plurality of update requests for an off-grid power system. The executing includes determining an amount of stored energy in one or more energy storage devices of the off-grid power system in response to at least one of the plurality of update requests, determining an amount of electrical power generatable by one or more renewable energy power systems of the off-grid power system in response to at least another of the plurality of update requests, determining a predicted reliability of at least a portion of the one or more energy storage devices and the one or more renewable energy power systems in response to at least another of the plurality of update requests, and determining an amount of electrical power for a remote facility that is electrically coupled to the off-grid power system in response to at least another of the plurality of update requests. The operations further include determining at least one control command for the off-grid power system based on the responses to the plurality of update requests; and providing the at least one control command to the off-grid power system to adjust an operation of at least one of the one or more energy storage devices or the one or more renewable energy power systems.

In an aspect combinable with the example implementation, the operation of determining the amount of stored energy in one or more energy storage devices includes determining a charge-discharge status of the one or more energy storage devices; determining a state-of-charge status of the one or more energy storage devices; and providing the at least one control command that is based in part on at least one of the charge-discharge status or the state-of-charge status.

In another aspect combinable with any of the previous aspects, the operation of determining the amount of electrical power generatable by one or more renewable energy power systems includes determining an amount of electrical power generatable by at least one photovoltaic (PV) power system of the off-grid power system; determining an amount of electrical power generatable by at least one fuel cell assembly of the off-grid power system; combining the determined amounts of electrical power by the at least one PV power system and the at least one fuel cell assembly; and providing the at least one control command that is based in part on the combined determined amounts of electrical power.

In another aspect combinable with any of the previous aspects, the at least one control command includes at least one instruction to operate at least one charger that is electrically coupled to the one or more energy storage devices to charge the one or more energy storage devices with at least one of the amount of electrical power generatable by the at least one PV power system or the amount of electrical power generatable by the at least one fuel cell assembly.

In another aspect combinable with any of the previous aspects, the operation of determining the predicted reliability of the portion of the one or more energy storage devices and the one or more renewable energy power systems includes determining an equipment health status of the at least one PV power system; determining an equipment health status of the at least one fuel cell assembly; and determining an equipment health status of the one or more energy storage devices.

In another aspect combinable with any of the previous aspects, the operations further include determining the combined determined amounts of electrical power based at least in part on the determined equipment health statuses.

In another aspect combinable with any of the previous aspects, the operation of determining the amount of electrical power for the remote facility that is electrically coupled to the off-grid power system includes determining a low frequency electrical demand load for the remote facility; determining a high frequency electrical demand load for the remote facility; combining the determined low and high frequency electrical demand loads; and providing the at least one control command that is based in part on the combined determined low and high frequency electrical demand loads.

In another aspect combinable with any of the previous aspects, the operations further include identifying one or more real time settings for the off-grid power system; updating one or more stored settings with the identified one or more real time settings for the off-grid power system; and changing the one or more real time settings for the off-grid power system based at least in part on the at least one control command.

In another aspect combinable with any of the previous aspects, the operation of executing the plurality of update requests for the off-grid power system includes executing at least one state machine to determine the amount of stored energy in the one or more energy storage devices, the amount of electrical power generatable by the one or more renewable energy power systems, the predicted reliability of the portion of the one or more energy storage devices and the one or more renewable energy power systems, and the amount of electrical power for the remote facility that is electrically coupled to the off-grid power system.

Implementations of an energy management system according to the present disclosure may include one or more of the following features. For example, an energy management system according to the present disclosure may enhance operational reliability and lifecycle cost for an off-grid power system for a remote location (for example, a location decoupled from a power transmission and distribution grid) due to, for instance, typical high operational costs in remote locations. As another example, an energy management system according to the present disclosure may maximize a life cycle cost of an off-grid power generation and storage system. As another example, an energy management system according to the present disclosure may improve an operational cost of an off-grid power generation and storage system. As another example, an energy management system according to the present disclosure may provide for higher energy efficiency and maximize energy utilization for an off-grid power generation and storage system. As another example, an energy management system according to the present disclosure may increase operational reliability for an off-grid power generation and storage system.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
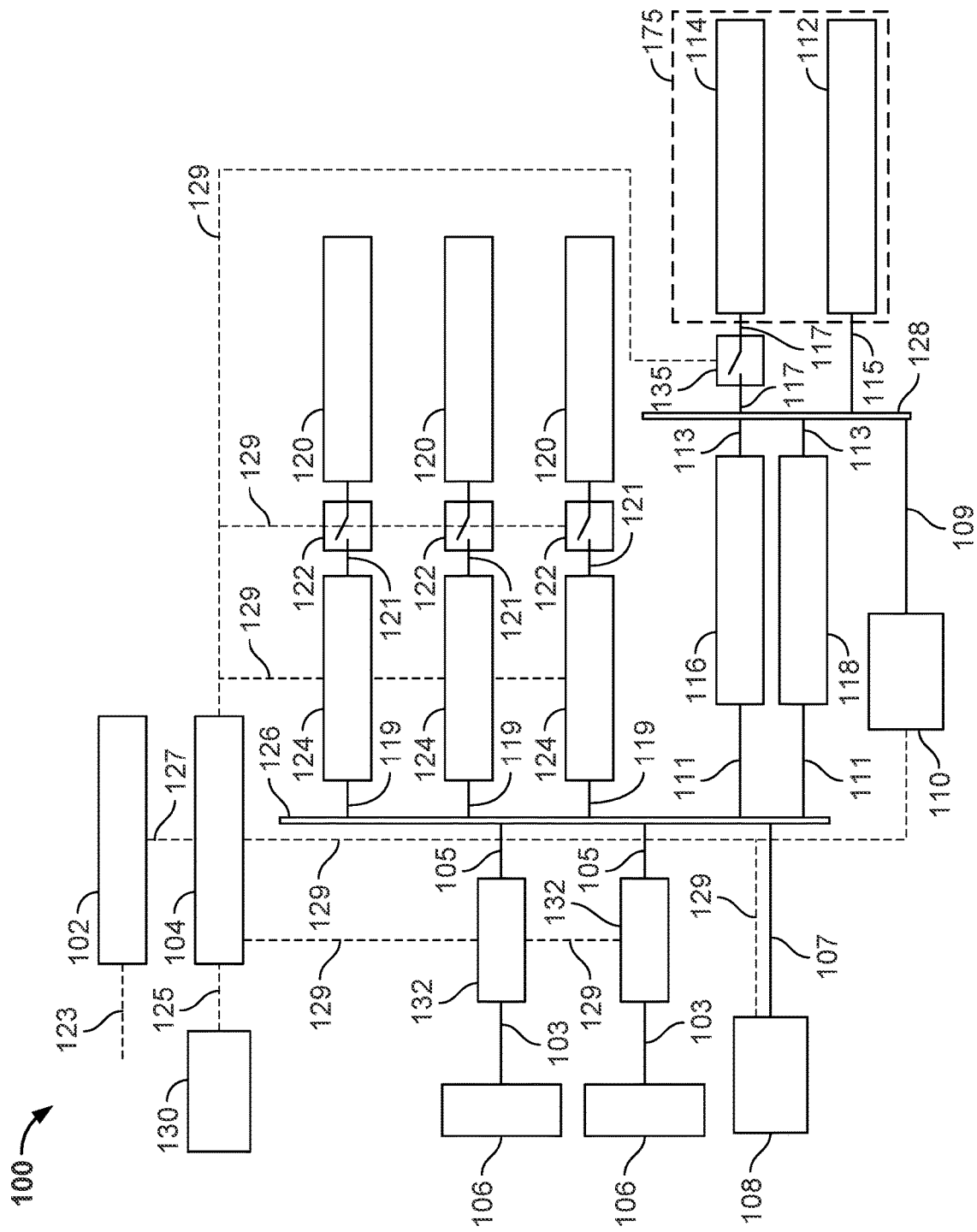
FIG. 1 is a schematic diagram of an example implementation of an energy management system that is part of or communicably coupled to an off-grid power generation and storage system according to the present disclosure.

FIG. 1 is a schematic diagram of an example implementation of an energy management system 102 that is part of or communicably coupled to an off-grid power generation and storage system ("off-grid power system") 100. Generally, in some aspects, the energy management system 102 may utilize one or more artificial intelligence techniques to maximize an energy use of a limited energy supply provided by the power system 100 by, for example, efficiently charging energy storage devices (for example, batteries) effectively, while applying power curtailing and load shifting for higher operational reliability and lifecycle cost reduction for the off-grid power system 100. In some aspects, as described later, the energy management system 102 may utilize multiple, integrated modules to efficiently control the operation of the off-grid power system 100.

Generally, off-grid power system 100 may include multiple off-grid power sources that generate electrical power from, in some cases, renewable energy sources. For instance, in some aspects, the off-grid power system 100 may be operable to provide full time (for example, 24 hours a day, 7 days a week, 52 weeks a year) electrical power to a remote facility 175 that is electrically decoupled from a power transmission and distribution grid. An example remote facility 175 can be, for instance, a hydrocarbon production facility for an unconventional reservoir. In this example implementation, the off-grid power system 100 includes several off-grid power sources. Alternative implementations of the off-grid power system 100 may include fewer or more off-grid power sources.

As shown in FIG. 1, the off-grid power system 100 includes one or more photovoltaic (PV) solar power cells 106. Generally, the PV solar power cells 106 convert solar energy to electrical power (for example, direct current (DC) electrical power) 103 by the photovoltaic effect through the exposure of the PV cells 106 to photons from the Sun. In this example, the off-grid power system 100 also includes a hydrogen-based fuel cell assembly 108 (such as, for example a polymer exchange membrane (PEM) fuel cell). In some aspects, the fuel cell assembly 108 may include multiple assemblies and are modular in nature. For example, each fuel cell assembly 108 may include multiple PEM fuel cell generators. Generally, the fuel cell assembly 108 is an electrochemical unit that produces electrical power (for example, DC electrical power) 107 without combustion using hydrogen and air as input fuel streams. In some aspects, the fuel cell assembly 108 produces DC electrical power 107 without, for instance, any $CO_2$ or $NO_x$ emissions or particulate matter (PM) and produces water as a by-product.

Hydrogen (not shown) can be supplied to the fuel cell assembly 108 by one or more hydrogen storage tanks that are fluidly coupled to the fuel cell assembly 108. In some aspects, each of the hydrogen storage tanks may be fillable (and re-fillable) with hydrogen to provide fuel for the fuel cell assembly 108.

As shown in this example, DC electrical power 103 from the PV solar power cells 106 is provided to DC/DC converters 132. The DC/DC converters 132 convert DC power (for instance, DC electrical power 103) from one voltage level to another voltage level. The DC/DC converters 132 are electrically coupled to provide converted DC power 105 to a DC bus 126, that is also electrically coupled to one or more energy storage system (ESS) chargers 124. As shown in this example, the DC electrical power 107 from the fuel cell assembly 108 is also provided to the DC bus 126.

In this example implementation, the ESS chargers 124 (three shown but more or fewer are possible) are electrically coupled to receive DC electrical power 119 from the DC power bus 126 and are also electrically coupled to one or more ESS batteries (or battery banks) 120 through controllable DC power circuit breakers 122. Generally, the controllable DC power breakers 122 can be controlled to charge the one or more ESS batteries (or battery banks) 120 with the DC electrical power 121 provided through the ESS chargers 124 from the DC electrical power 119 of the DC power bus 126. The controllable DC power breakers 122 can also be controlled to discharge the one or more ESS batteries (or battery banks) 120 through the ESS chargers 124 to provide the DC electrical power 119 to the DC power bus 126.

As shown in FIG. 1, one or more DC/AC (alternating current) inverters 116 are electrically coupled between the DC power bus 126 and an AC power bus 128. The DC/AC inverters 116 are operable to convert DC electrical power 111 to AC electrical power 113 to supply the AC electrical power 113 to the AC power bus 128. Further, one or more AC/DC rectifiers 118 are electrically coupled between the DC power bus 126 and the AC power bus 128. The AC/DC rectifiers 118 are operable to convert AC electrical power 113 to DC electrical power 111 to supply the DC electrical power 111 to the DC power bus 126.

In this example implementation, one or more generators 110 is also electrically coupled to the AC power bus 128 to provide, when operated, AC electrical power 109 to the AC power bus 128. In some aspects, the generator 110 may include or be a diesel generator or other stand-alone power generator that uses a hydrocarbon fuel source.

As shown in this example of FIG. 1, the remote facility 175 includes critical electrical loads 112 and non-critical electrical loads 114. In this example, the non-critical electrical loads 114 are electrical coupled to the AC power bus 128 through a switch (or breaker) 135 to receive AC electrical power 117 from the AC power bus 128. The critical electrical loads 112 are, in this example, directly to the AC electrical power bus 128 to receive AC electrical power 115 from the AC power bus 128.

As shown in the example implementation of FIG. 1, a controller (or control system 104 is communicably coupled (for example, through one or more wired or wireless connections) to one or more components of the off-grid power system 100 through communications 129. Generally, the communications 129 can include operational commands or instructions transmitted from the controller 104 to one or more particular components of the off-grid power system 100, as well as data (for example, operational data or sensed data) transmitted from the one or more particular components of the off-grid power system 100 to the controller 104. In some aspects, the controller 104 is a microprocessor-based programmable logic controller (PLC).

In this example, the controller 104 is communicably coupled (for example, through one or more wired or wireless connections) to a weather station 130 (or otherwise, a source of weather data 125). The weather data 125 can include real-time weather data (for example, dry bulb temperature, wet bulb temperature, relative humidity, barometric pressure, wind speed, solar radiation, cloud cover, and other data) as well as historical weather data (for example, weather data aggregated or otherwise combined over a period of hours, days, weeks, months, years, or otherwise).

The energy management system 102 is communicably coupled (for example, through one or more wired or wireless connections) to the controller 104 to provide communications 127 to and receive communications 127 from the controller 104. In this example, the energy management system 102 comprises an industrial computing system that includes one or more hardware processors coupled to one or more memory modules, some of which can store executable instructions in the form of software and/or firmware. The communications 127 can include, for example, commands or operational instructions from the energy management system 102 to the controller 104 (for example, to operate one or more components of the off-grid power system 100). The communications 127 can also include, for example, data or operational feedback from the controller 104 to the energy management system 102 (for example, operational feedback from the one or more components of the off-grid power system 100). Such operational feedback (or operational commands) may be provided by the energy management system 102 through status feedback 123, such as to a remote facility or operator.

Generally, the energy management system 102 may operate to control operations of the off-grid power system 100 (through the controller 104) to provide electrical power (for example, 24 hours a day, 7 days a week) to the remote facility 175. For example, when sufficient (or excess) solar energy is available, the energy management system 102 can operate the PV solar power cells 106 to provide DC electrical power 103 to power (through the DC/DC converters 132, if necessary, to the DC power bus 126, through the DC/AC inverters 116, and to the AC power bus 128) the remote facility 175. Excess solar power can be provided (by the PV solar power cells 106) to charge the ESS batteries 120 through the ESS chargers 124. Further, the energy management system 102 can operate the fuel cell assembly 108 to generate DC electrical power 107 to also charge the ESS batteries 120 through the ESS chargers 124 (from the DC power bus 126), while the PV solar power cells 106 provide all required power to the remote facility 175. When insufficient solar energy is available, the energy management system 102 can operate the fuel cell assembly 108 to provide DC electrical power 107 to power (through the DC power bus 126, through the DC/AC inverters 116, and to the AC power bus 128) the remote facility 175. In some aspects, excess power generated by the fuel cell assembly 108 can be provided to also charge the ESS batteries 120 through the ESS chargers 124 (from the DC power bus 126). In some aspects, such as when solar energy is insufficient and the DC electrical power 107 from the fuel cell assembly 108 is insufficient to power the remote facility 175, the energy management system 102 can operate the generator 110 to provide AC electrical power 109 to the AC power bus 128 (and to the remote facility 175).

Figure 2:
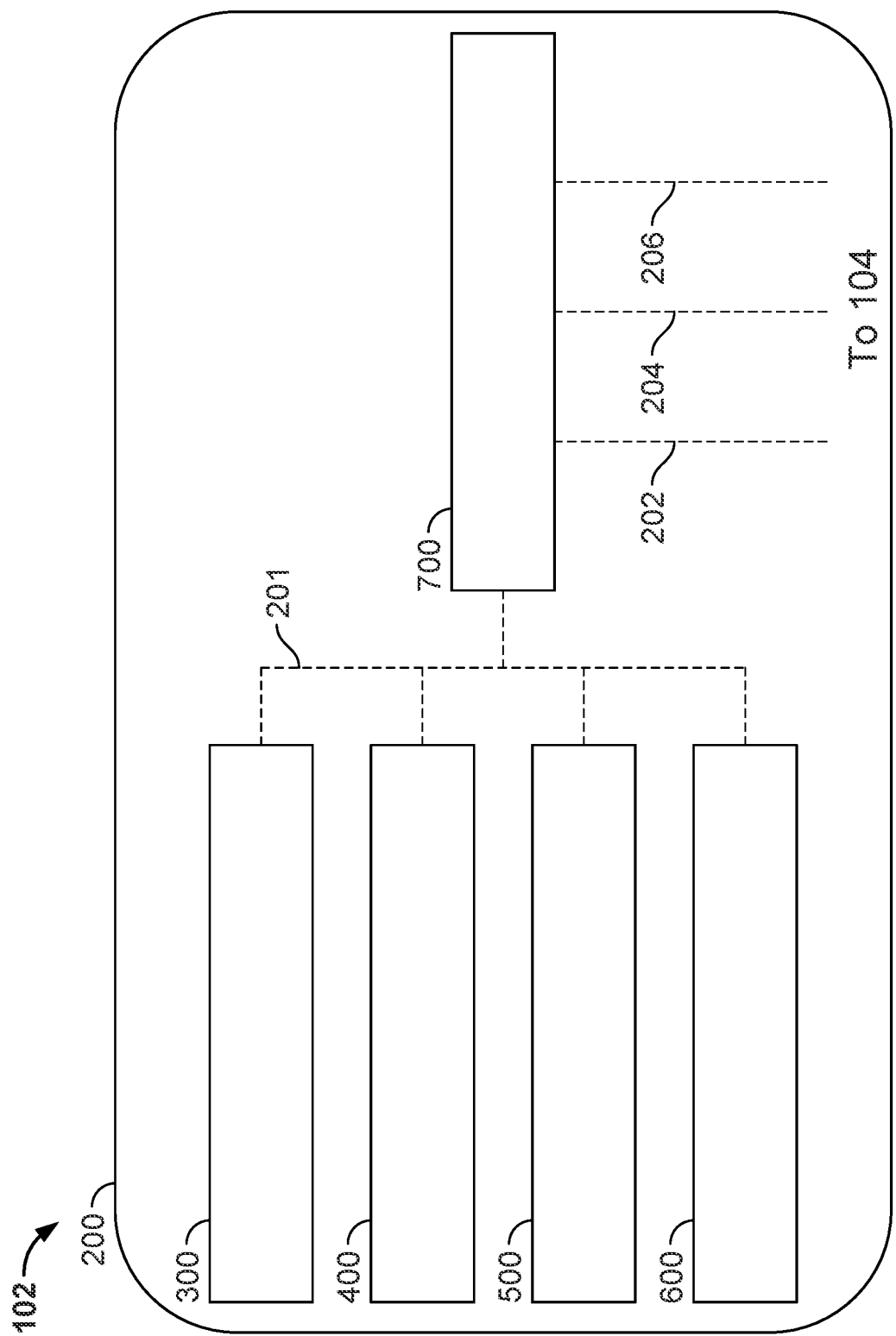
FIG. 2 illustrates a schematic diagram of an example implementation of an energy management system according to the present disclosure.

FIG. 2 illustrates a schematic diagram of an example implementation of the energy management system 102 of FIG. 1. In this example, the energy management system 102 includes an architecture 200 that is executable on the energy management system 102 (as a microprocessor based computing device) to efficiently operate the off-grid power system 100. In this example, the architecture 200 includes an energy storage management (ESM) module 300, a predictive energy generation (PEG) module 400, a predictive system reliability (PSR) module 500, and a predictive energy demand (PED) module 600. Each of the modules 300, 400, 500, and 600 provide input 201 to a decision making and reporting (DMR) module 700. The DMR module 700 provides outputs (for example, to the controller 104 and as status feedback 123) in the forms of system monitoring data 202, control command data 204, and status reporting data 206.

Generally, the ESM module 300 executes to, for example, control operations of the ESS chargers 124, the circuit breakers 122, and the ESS batteries 120. For example, the ESS batteries 120 may a three-cycle charging regime (for example, bulk, absorption, and float). In bulk charging, the charging takes about 5-6 hours to charge 70-80% of the battery capacity. Absorption charging takes about 12-14 hours to increase battery state of charge from 70-80% to 90-95% state of charge. Float charge holds a battery state of charge at 95% until the next discharge cycle. In some aspects, the ESS batteries 120 may be charged and discharged at the same time. In the case of between 5-6 sun hours a day availability, the ESM module 300 may operate to predict available solar energy for the next day and operate the ESS chargers 124 to store a maximum amount of solar energy (in the ESS batteries 120) by making algorithmic decision to apply a round robin charging mechanism to include absorption charging (which is conventionally removed due to insufficient sun hours). The ESM module 300 can also execute to operate the power sources other than the PV solar power cells 106 (for example, the fuel cell assembly 108, the generator 110, or both) to charge the ESS batteries 120 through the ESS chargers 124.

Generally, the PEG module 400 executes to, for example, predict an amount of electrical power supplied from the PV solar power cells 106 by using, for example, historical weather pattern data (near term and long term), such as from the weather data 125, satellite data, or other weather station data. The PEG module 400 can also execute to control, for example, a robotic cleaning system for the PV solar power cells 106 to minimize solar power losses due to soiling/dirt on the PV cells. The PEG module 400 can also execute to make economic decisions on utilizing different power supply sources (for example, the PV solar power cells 106, the fuel cell assembly 108, the ESS batteries, and the generator 110) based on, for example, minimum load demand requirements of the remote facility 175 and the available stored and expected energy. In some aspects, the PEG module 400 is predictive in nature and uses artificial intelligence algorithms using neural networks or fuzzy logic.

Generally, the PSR module 500 executes to, for example, monitor performance of the power supplies in the off-grid power system 100, such as the PV solar power cells 106, the fuel cell assembly 108, the ESS batteries 120, and the generator 110. In some aspects, the PSR module 500 may also execute to monitor (and control) other components of the off-grid power system 100, such as, for example, the ESS chargers 124, the circuit breakers 122, the DC/DC converters 132, the DC/AC inverters 116, the AC/DC rectifiers 118, and the switch 135 to maintain reliability. For example, the PSR module 500 may execute to maintain reliability by isolating failed or closure to fail components as well as providing various alarm signals. The alarm signals can include, for example, prediction of possible failure by performing comparative performance analysis based on historical generation data and real time data for the PV solar power cells 106. The alarm signals can also include prediction of failure will be based on historical and real time efficiency measures and fuel consumption and operational hours for the fuel cell assembly 108, the generator 110, or both. The alarm signals can also include prediction of possible failure by performing comparative performance analysis based on historical and real time charge and discharge cycles, temperature and voltage measurements for the ESS batteries 120. The alarm signals can also include monitoring of production performance based on historical and real time data by applying comparative analysis to predict possible failures for the ESS chargers 124, the circuit breakers 122, the DC/DC converters 132, the DC/AC inverters 116, the AC/DC rectifiers 118, and the switch 135. The alarm signals can also include monitoring of PV solar power cell 106 performance to predict robotic cleaning system failures for a robotic cleaning system.

Generally, the PED module 600 executes to, for example, predict near term energy demand requirements by using daily and seasonal energy demand historian data. Facility energy load demand can be combined from equipment operational data for continuous operation, seasonal operation, intermittent operation or any combination thereof. In some aspects, the PED module 600 uses artificial intelligence modeling to predict near term energy demand. The PED module 600 may also execute to provide alarms of critical equipment failure, load shifting recommendations, and power curtailing recommendations by shutting down non-critical loads 114 of the remote facility 175 based on daytime and seasonal operation.

As described, the DMR module 700 receives (for example, continually or intermittently) inputs 201 from the modules 300, 400, 500, and 600. The DMR module 700 can execute to provide the following functionality in order to maximize energy conservation, improve operational reliability, and save significant operational cost. Such functionality can include utilizing energy within the most effective way (in other words, energy conservation) by applying power curtailing and load shifting to match energy demand and supply based on available resources. Such functionality can also include maximizing system reliability by isolating failed sub systems, as well as generating warnings and alarm signals. Such functionality can also include a records subsystem of operational and alarm data, as well as energy generation and demand data.

Figure 3A:
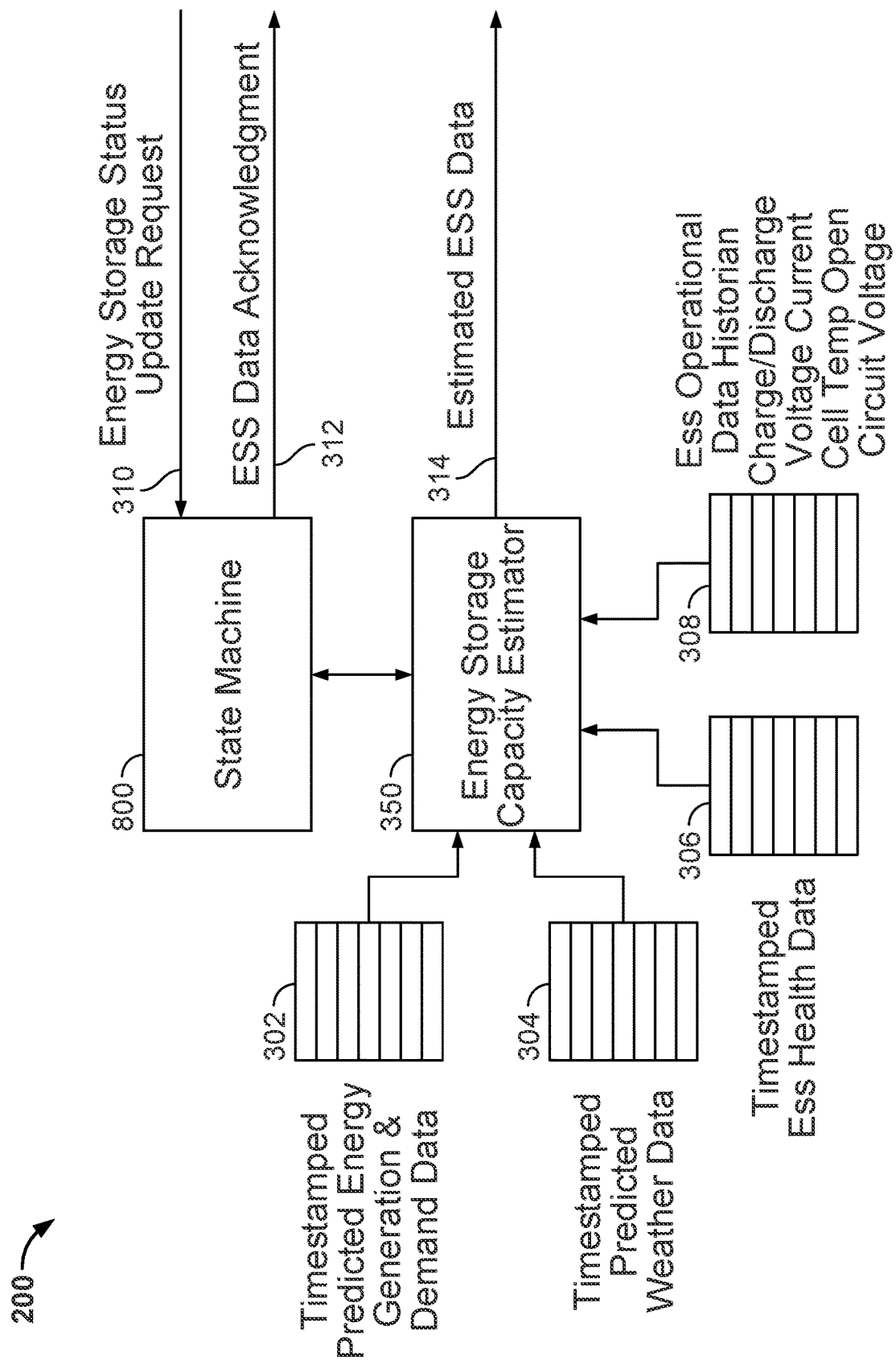
FIGS. 3A-3C illustrate schematic diagrams that describe an energy storage module of the energy management system of FIG. 2 according to the present disclosure.
Figure 3B:
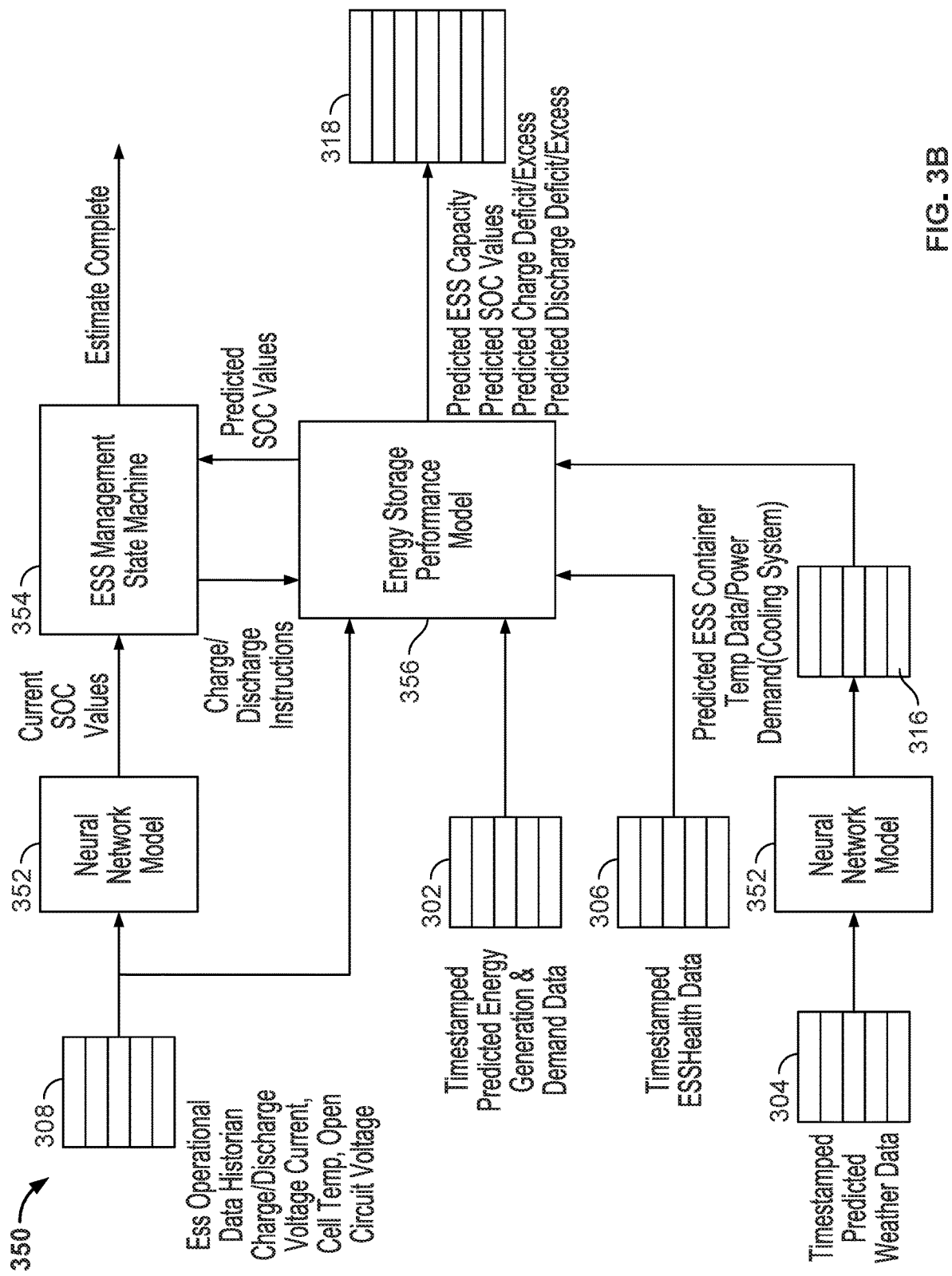
Figure 3C:
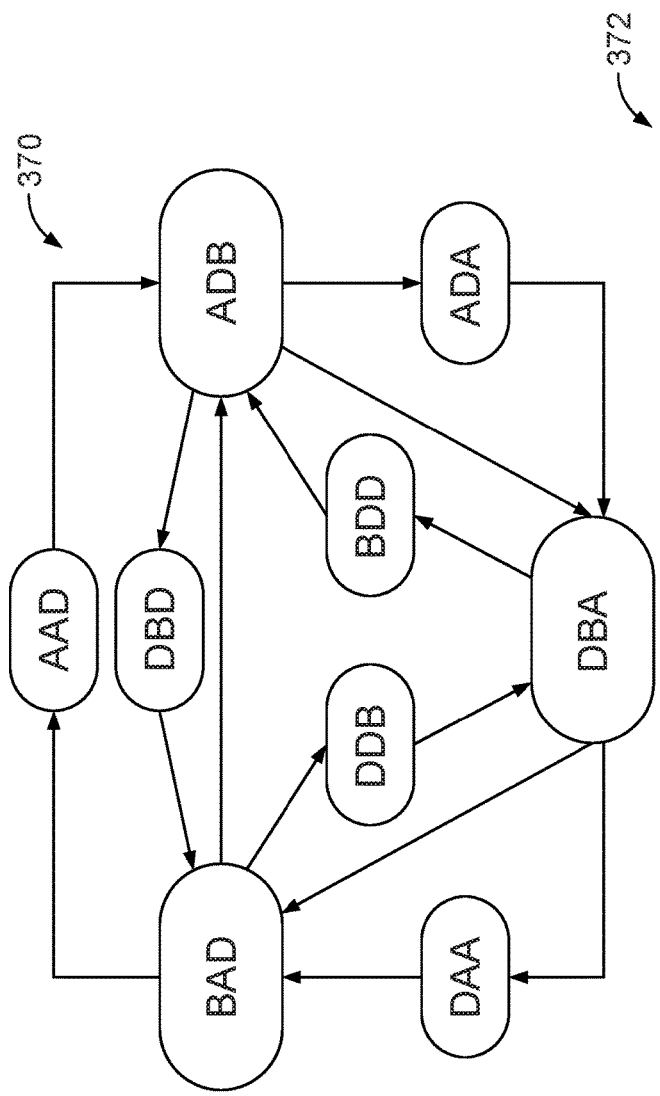

FIGS. 3A-3C illustrate schematic diagrams that describe the ESM module 300 of the energy management system 102 of FIG. 2. For example, as shown in FIG. 3A, the ESM module 300 includes an energy storage capacity estimator 350 that receives input data 302, 304, 306, and 308, and is operably coupled to a state machine 800. The energy storage capacity estimator 350 uses the inputs 302 through 308 and input from the state machine 800 to provide estimated ESS data 314 to the DMR module 700.

Figure 8:
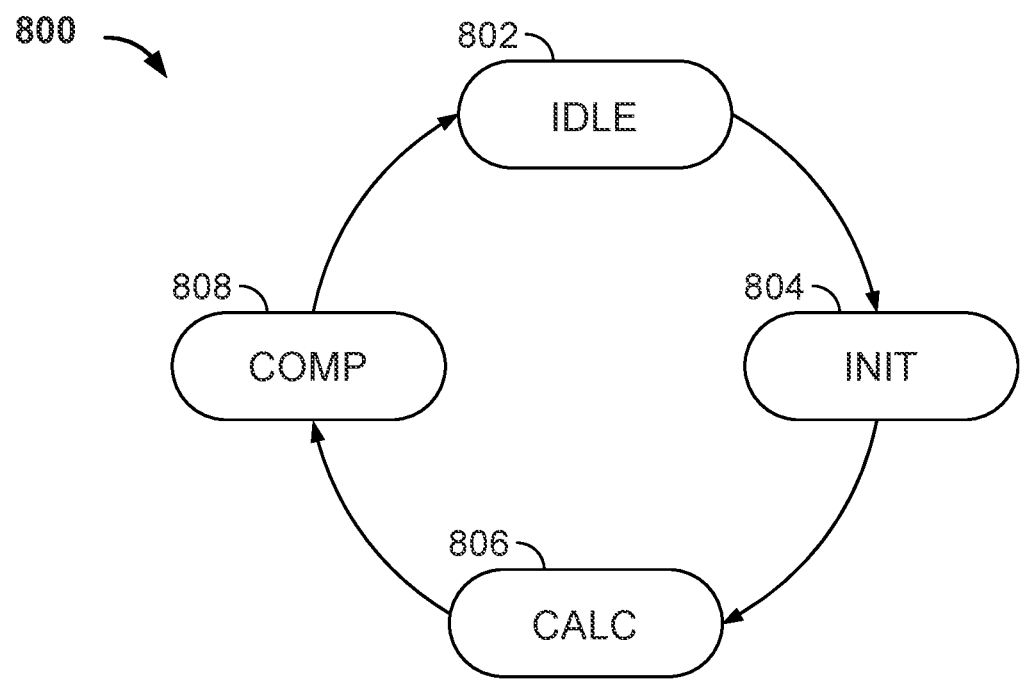
FIG. 8 illustrates a schematic diagram of a state machine used in the energy management system of FIG. 2 according to the present disclosure.

In this example, the input data to the energy storage capacity estimator 350 includes timestamped predicted energy generation and demand data 302, timestamped predicted weather data 304, timestamped ESS health data 306, and ESS operations data (historical) 308 (for example, charge/discharge, voltage-current, PV cell temperature, open circuit voltage). In this example, the energy storage capacity estimator 350 executes with state machine 800. Turning briefly to FIG. 8, this figure illustrates a schematic diagram of the state machine 800 that is used in the ESM module 300 (and other modules) of the energy management system 102. The state machine 800 operates to perform proper handshaking and computational function by executing an IDLE state 802, an INIT state 804, a CALC state 806, and a COMP state 808. Each state performs a different function.

For example, for the ESM module 300, during IDLE state 802, the state machine 800 only waits for a request signal 310 from the DMR module 700. Once the request signal is received, the state machine 800 moves into INIT state 804 to ensure all required up to date historical data is stored within an input memory. Once all data gets updated, the state machine 800 moves into CALC state 806 and initiates the energy storage estimator 350 to compute a current and expected battery bank state of charge (SOC) conditions as well as available capacities and charge/discharge deficits to be stored into output memory. Once the computational work is completed and all data is stored in output memory, the state machine 800 moves into COMP state 808 and an acknowledgement signal 312 is enabled to indicate that the request is completed. The state machine 800 moves into IDLE state 802 waiting for the next request.

FIG. 3B illustrates a schematic diagram of an example implementation of the energy storage capacity estimator 350. As shown, using historical operational data (inputs 302, 304, 306, 308), current state of charge (SOC) conditions for the ESS batteries 120 are computed using neural networks 352. This information is sent to both an ESS management state machine 354 and an ESS performance model 356. The state machine 354 tracks each battery charge condition to provide charge and discharge instructions tagging to the ESS performance model 356. The ESS performance model 356 can use predicted excess energy for charging and predicted demand energy for discharging to compute predicted SOC results (as part of output 318). The ESS performance model 356 also can add predicted auxiliary load demand data for battery cooling systems to predict facility demand data. As a result, the ESS performance model 356 can provide predicted battery bank SOCs, capacities, charge/discharge excess and deficits values together as output 318 to be saved into an output memory. Once the computation by the ESS performance model 156 is complete, acknowledgment data ("estimate complete") is sent to the DMR module 700.

In an example implementation, there can be three ESS battery banks 120. FIG. 3C illustrates a state machine diagram 370 and accompanying table 372 that shows details and transactions of the ESS management state machine 354 for three ESS battery banks 120 (labeled Battery Bank 1, Battery Bank 2, and Battery Bank 3 in table 372). As previously described, an ESS battery bank 120 may have three charging states. In this example, the state machine 354 may have two charging transactions: bulk (B), absorption/float (A). The state machine 354 may also have a discharge (D) transaction for a particular one of the battery banks.

Figure 4A:
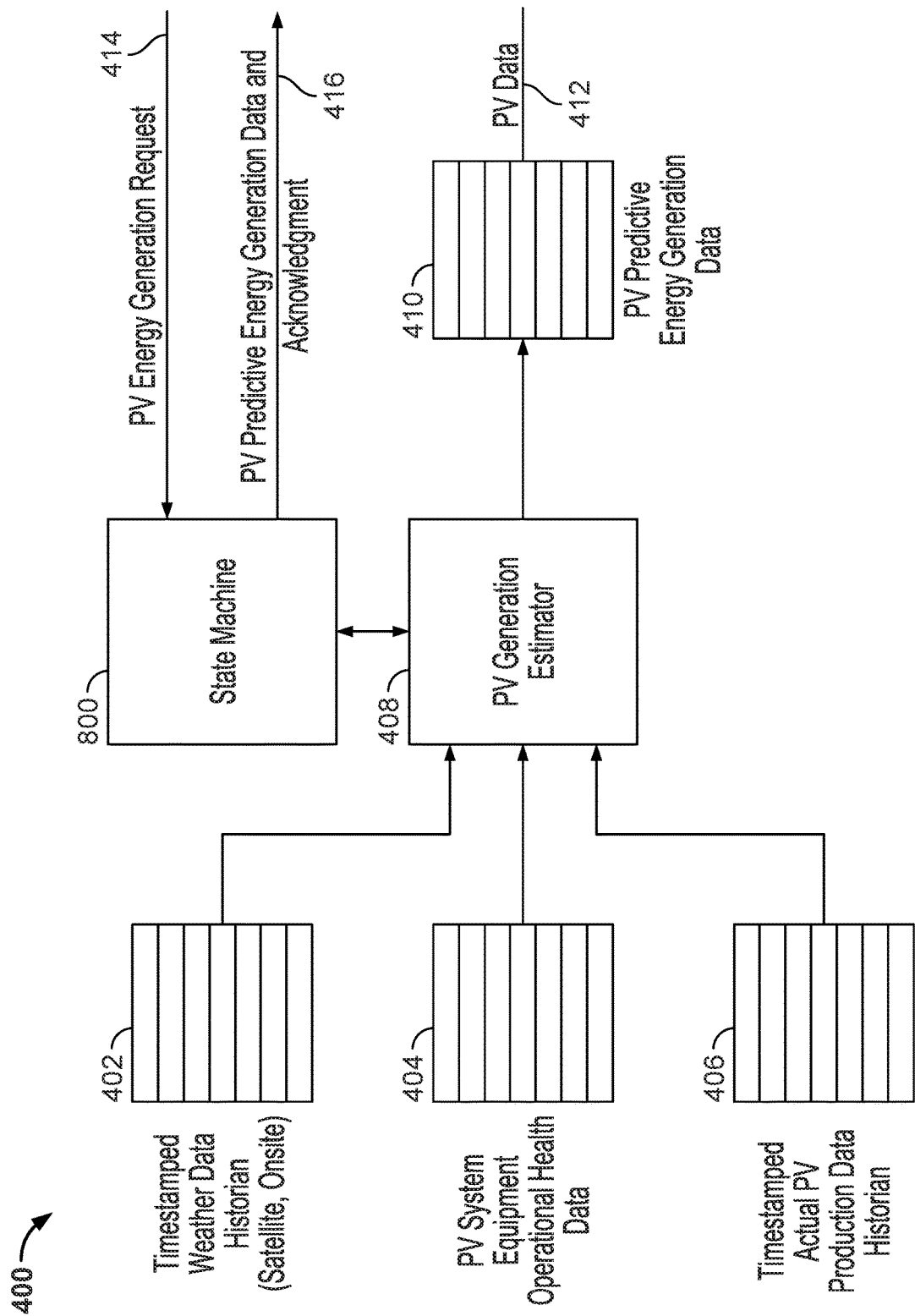
FIGS. 4A-4D illustrate schematic diagrams that describe a predictive energy generation module of the energy management system of FIG. 2 according to the present disclosure.
Figure 4B:
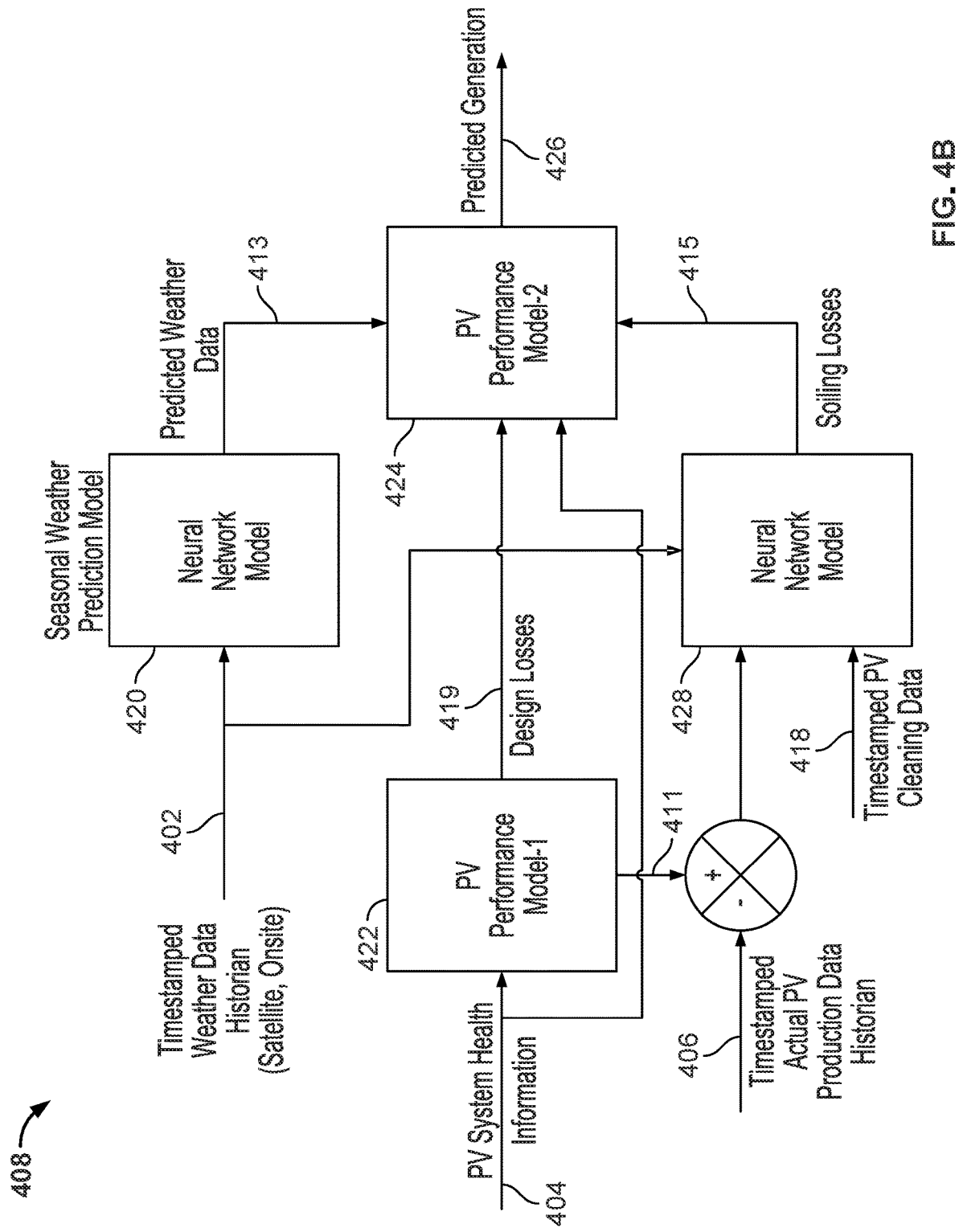

FIGS. 4A-4B illustrate schematic diagrams that describe a portion of the PEG module 400 of the energy management system 102 of FIG. 2. For example, as shown in FIG. 4A, the PEG module 400 includes a PV generation estimator 408 that receives input data 402, 404, and 406, and is operably coupled to a state machine 800. The PV generation estimator 408 uses the inputs 402 through 406 and input from the state machine 800 to provide PV predictive energy generation data 410 as PV data 412 to the DMR module 700.

In this example, the input data to the PV generation estimator 408 includes timestamped weather data (historical) 402, PV system equipment operational health data 404, and timestamped actual PV production data (historical) 406. In this example, the PV generation estimator 408 executes with state machine 800 (shown in FIG. 8 and described previously). In this example, during IDLE State 802, the state machine 800 waits for request signal 414 from the DMR module 700. Once the DMR module 700 sends a request 414, then the state machine 800 moves into INIT state 804 to ensure all required up to date information is stored within the input memory. Once all data is updated, the state machine 800 moves into CALC state 806, which enables the PV generation estimator 408 to calculate predictive PV energy output data for the next day and to store the data into output memory. Once the computational work is completed, the state machine 800 moves into COMP state 808, an acknowledgement signal 416 is enabled to indicate that the request is completed. The state machine 800 goes into IDLE state 802 waiting for new request.

FIG. 4B illustrates a schematic diagram of an example implementation of the PV generation estimator 408. As shown in FIG. 4B, this implementation of the PV generation estimator 408 includes two neural network prediction models 420 and 428 along with PV performance models 422 and 424. As shown, input data 402 is provided to the neural networks 420 and 428. Input data 404 is fed to the PV performance models 422 and 424. In this example, neural network model 420 can predict next day hourly weather data. In some aspects, a dedicated neural network model is used for temperature and irradiance. Besides historian weather data (input 402), historian time stamped deviation data between on-site and satellite data can also be used as an input parameter. In this example, the neural network model 428 can predict soiling losses, which may be a highly non-linear function. Timestamped PV cleaning data 418, along with historical time stamped weather data 402 and soiling losses data 415 can be inputs into the neural network model 428. To obtain soiling losses, near term historical weather data can be fed through the PV performance model 422, which may not capture soiling losses to estimate expected PV production. Time stamped soiling behavior may be obtained by taking a difference between actual PV production data 406 and expected PV production data 411.

In some aspects, the PV performance model 424 provides a PV energy production forecast by using predicted weather data 413 from the neural network model 420, soiling data 415, and design loss data 419. Adaptive filtering prediction models can use a multi-layer, cascaded, non-linear autoregressive feedback loop with tapped delay lines and neural networks model. Number of layers, convergence algorithms, number of tapped delays can be specific to each data type.

Figure 4C:
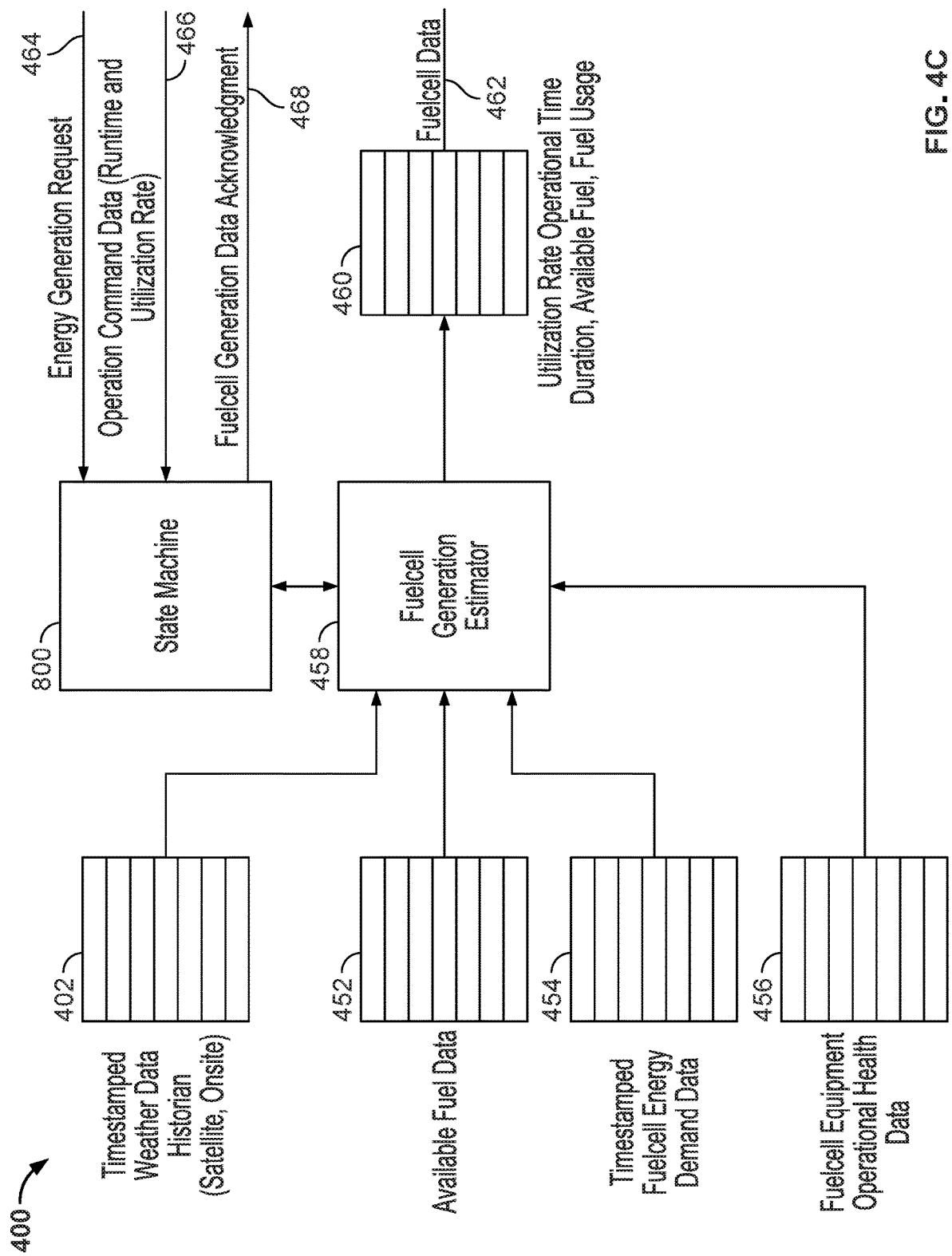
Figure 4D:
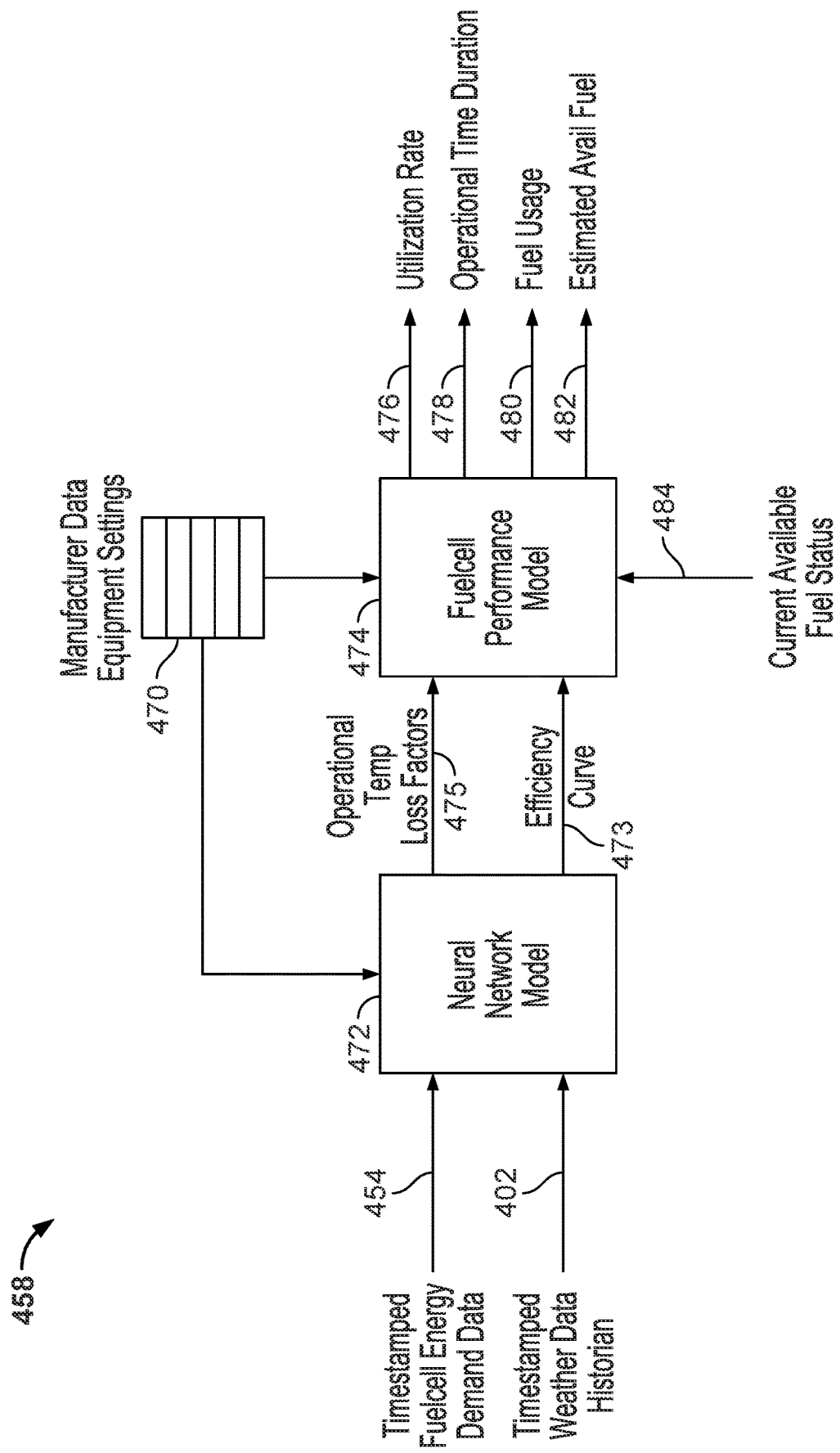

FIGS. 4C-4D illustrate schematic diagrams that describe another portion of the PEG module 400 of the energy management system 102 of FIG. 2. For example, as shown in FIG. 4C, the PEG module 400 includes a fuel cell generation estimator 458 that receives input data 402 (timestamped weather data (historical)), as well as available fuel data 452, timestamped fuel cell energy demand data 454, and fuel cell equipment operations health data 456, and is operably coupled to a state machine 800. The fuel cell generation estimator 458 uses the inputs 402, 452, 454, and 456 and input from the state machine 800 to provide fuel cell data 462 (for example, estimated data 460 that can include utilization rate, operational time duration, available fuel, fuel usage) to the DMR module 700.

In this example, the fuel cell generation estimator 458 executes with state machine 800 (shown in FIG. 8 and described previously). In this example, during IDLE state 802, state machine 800 waits for a request signal 464 from the DMR module 700. Once the request signal 464 (and operational command data 466, such as runtime and utilization rate) is received, the state machine 800 moves into INIT state 804 to ensure all required up to date historical data is stored within the input memory. Once all data gets updated, the state machine 800 moves into CALC state 804 to initiate the fuel cell generation estimator 458 to compute an expected fuel cell energy generation as well as fuel status to be stored into output memory. Once the computational work is completed and all data is stored in output memory, the state machine 800 moves into COMP state 808, and an acknowledgement signal 468 is enabled to indicate that the request is completed. The state machine 800 goes into IDLE state 802 waiting for the next request.

FIG. 4D illustrates a schematic diagram of an example implementation of the fuel cell generation estimator 458. As shown in FIG. 4D, this implementation of the fuel cell generation estimator 458 includes a neural network model 472 and a fuel cell performance model 474. As shown, input data 402 and 454, as well as manufacturer data equipment settings data 470, is provided to the neural network model 472. The input data 470 and current available fuel status 484 are provided to the fuel cell performance model 474. The neural network model 472 can be used for creating a timestamped efficiency curve 473 based on timestamped demand data (for example, energy deficit data=PV minus facility demand data minus energy storage charging). The output of the efficiency curve 473 is provided to the fuel cell performance model 474. In some aspects, the fuel cell performance model 474 is a mathematical model that uses operational temperature loss factors 474 and the efficiency curve 473, as well as the available fuel status 484 and manufacturer technical data and equipment settings 470, to provide optimum operational mode data, including utilization rate 476, total fuel usage 480, operational duration 478, and estimated fuel availability 482. As with the PV performance model 424, adaptive filtering prediction models can use a multi-layer, cascaded, non-linear autoregressive feedback loop with tapped delay lines and neural networks model. Number of layers, convergence algorithms, number of tapped delays can be specific to each data type.

Figure 5A:
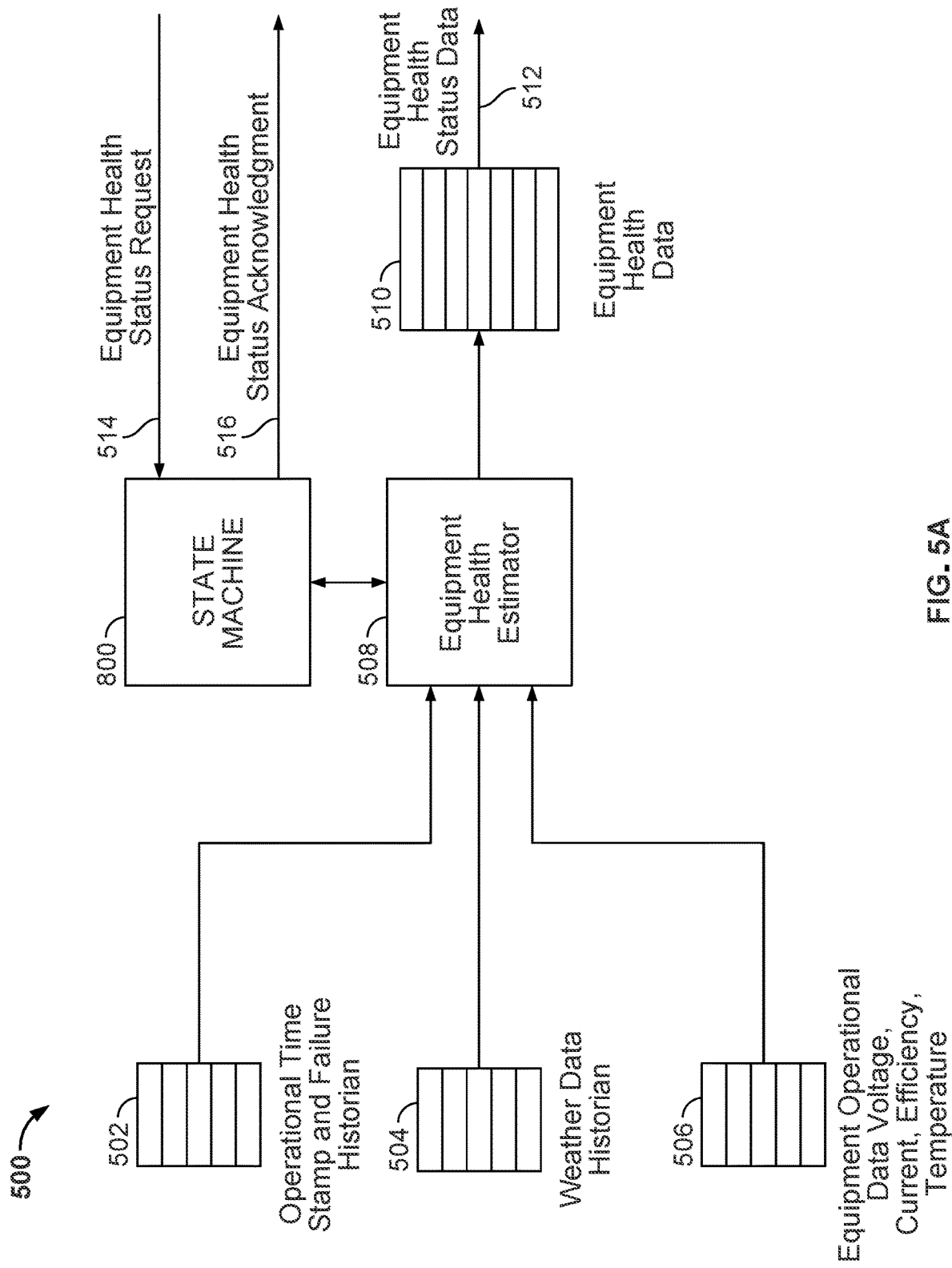
FIGS. 5A-5B illustrate schematic diagrams that describe a predictive system reliability module of the energy management system of FIG. 2 according to the present disclosure.
Figure 5B:
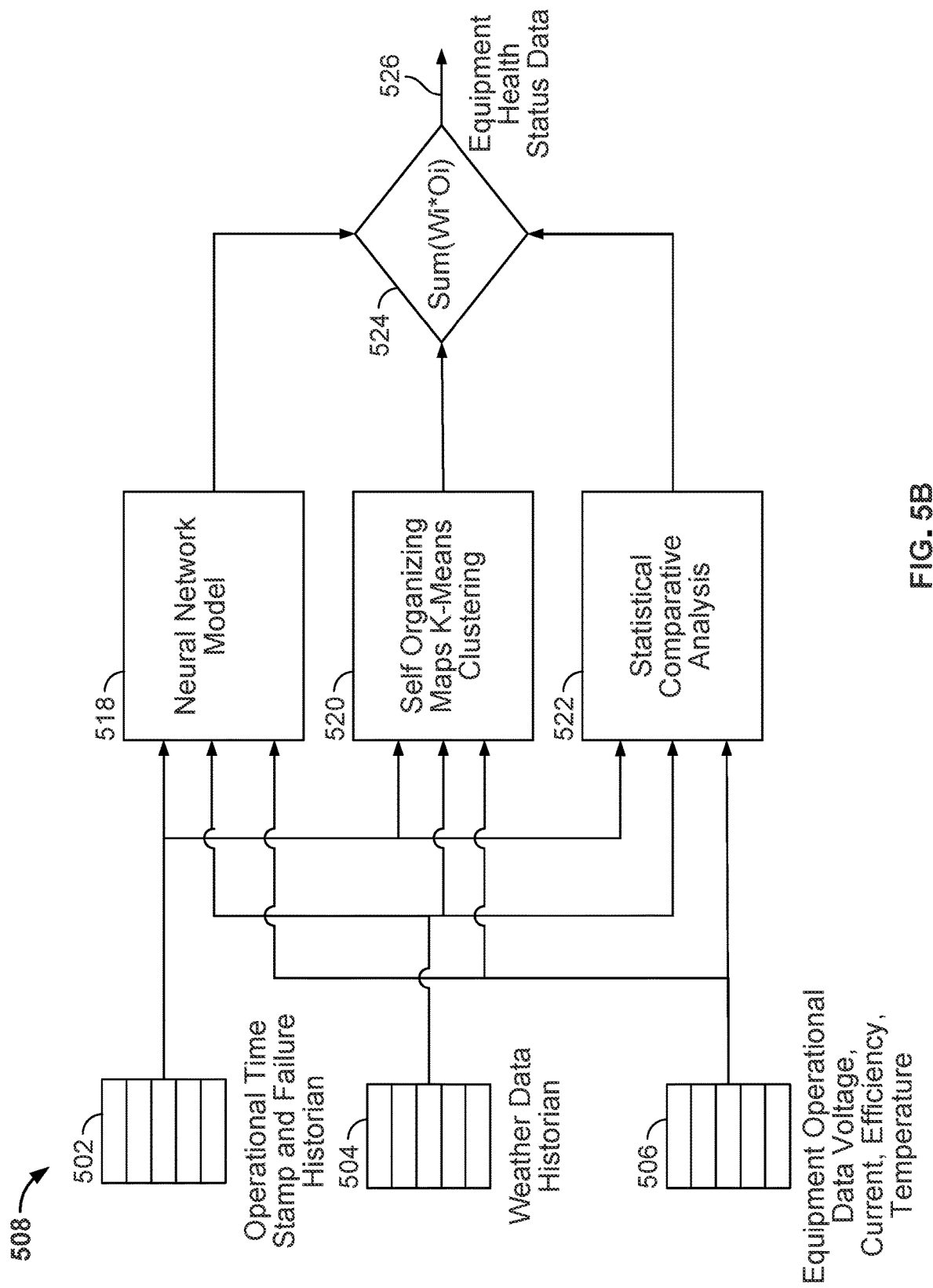

FIGS. 5A-5B illustrate schematic diagrams that describe the PSR module 500 of the energy management system 102 of FIG. 2. For example, as shown in FIG. 5A, the PSR module 500 includes an equipment health estimator 508 that receives input data 502, 504, and 506, and is operably coupled to a state machine 800. The equipment health estimator 508 uses the inputs 502 through 506 and input from the state machine 800 to provide equipment health status data 512 (that includes equipment health data 510) to the DMR module 700.

In this example, the input data to the equipment health estimator 508 includes operational time stamp and failure data (historical) 502, weather data (historical) 504, and equipment operational data 506 (such as voltage, current, efficiency, temperature). In this example, the equipment health estimator 508 executes with state machine 800 (shown in FIG. 8 and described previously). For example, during IDLE state 802, the state machine 800 waits for a request signal 514 from the DMR module 700. Once the request signal 514 is received, the state machine 800 moves into INIT state 804 to ensure all required up to date historical data is stored within the input memory. Once all data gets updated, the state machine 800 moves into CALC state 806 and initiates the equipment health estimator 508 to compute equipment health data to be stored into output memory. Once the computational work is completed and all data is stored in output memory, the state machine 800 moves into COMP state 808 and an acknowledgement signal 516 is enabled to indicate that the request is completed. The state machine 800 moves into IDLE state 802 waiting for the next request.

FIG. 5B illustrates a schematic diagram of an example implementation of the equipment health estimator 508. In this implementation, the equipment health estimator 508 can be replicated for each power source in the off-grid power system 100: the PV solar power cells 106, the ESS batteries 120, and the fuel cell assembly 108 (and their accompanying components). The replication may be granular, such as per PV solar power cell, per ESS battery bank, per inverter or converter or rectifier, per charge controller). The equipment health estimator 508 can have multiple predictive models as shown, including a neural network model 518, a self-organizing maps/K-means clustering model 520, and a statistical comparative analysis 522. As shown, each of inputs 502, 504, and 506 may be provided to the three, multiple predictive models as part of the equipment health estimator 508.

In the example implementation of the equipment health estimator 508, the neural network model 518 may be comprised of one or both of a fuzzy neural network (FNN) model or pattern recognition feed forward neural network (FFN). In some aspects, since a neural network model may require unsupervised learning, the models that comprise the neural network model 518 can be trained with a Bayesian algorithm to avoid overfitting.

In this example, self-organizing maps/K-means clustering model 520 can be an unsupervised neural network, based on competitive learning that implements a non-linear smooth mapping of a high-dimensional input space onto a low-dimensional output space. The neurons of the model 520 can form a topologically ordered low-dimensional lattice (for example, two-dimensional) that is a visualization tool to extract knowledge about the nature of the input space data. In some aspects, K-means clustering is another type of grouping algorithm, which works based on sum-of-squared distances between data points and all centroids by assigning each data point to the closest cluster.

In this example, the statistical comparative analysis model 522 can use mean and standard deviation to perform correlation against past performances and to perform cross-correlation within the same class of devices or components. In the example implementation, a final weighted average output as determined by a function 524 can provide a deterministic health score 526. Different weights can be determined based on equipment type (for example, of the PV solar power cells 106, the ESS battery banks 120, the fuel cell assembly 108, or a combination thereof).

Figure 6A:
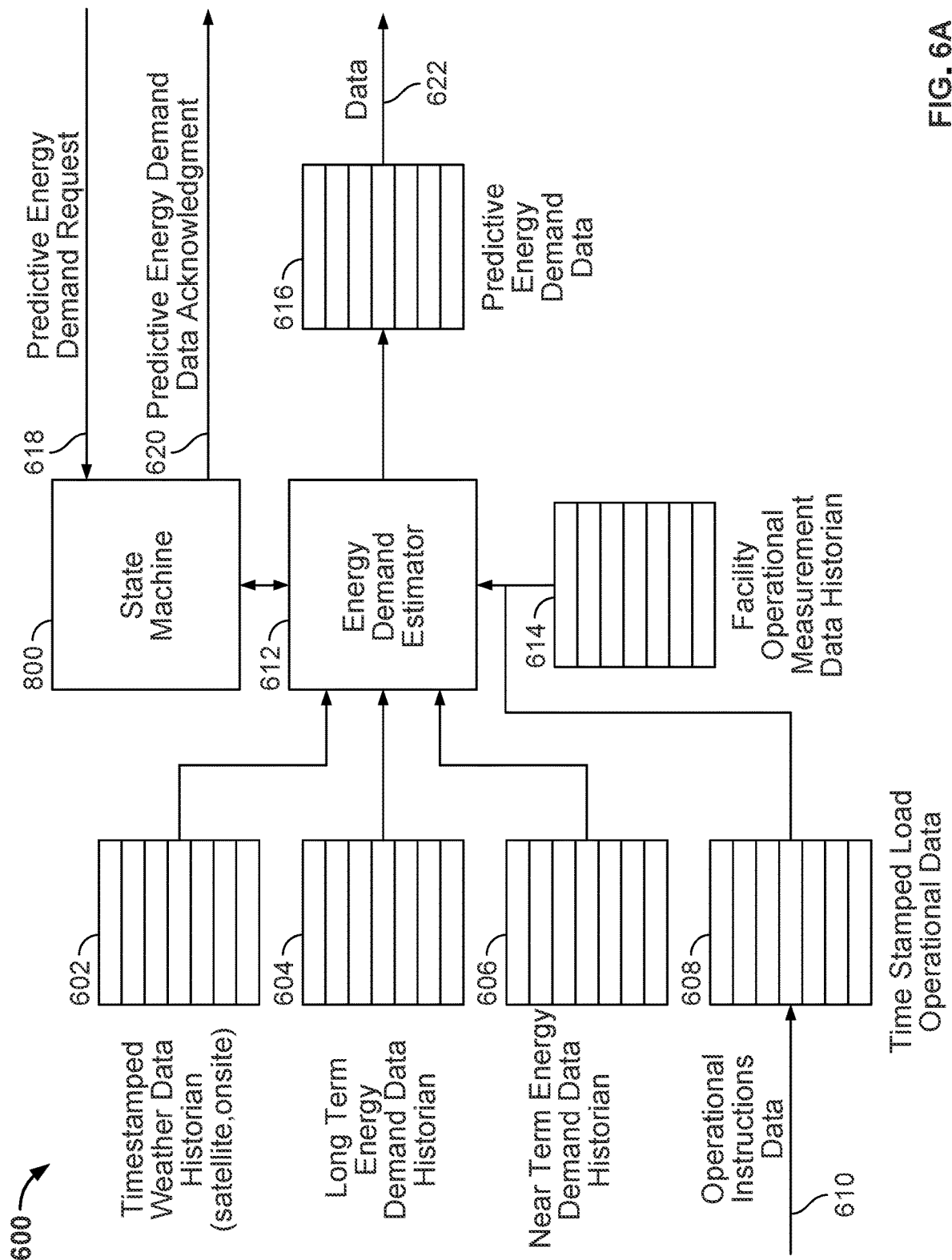
FIGS. 6A-6B illustrate schematic diagrams that describe a predictive energy demand module of the energy management system of FIG. 2 according to the present disclosure.
Figure 6B:
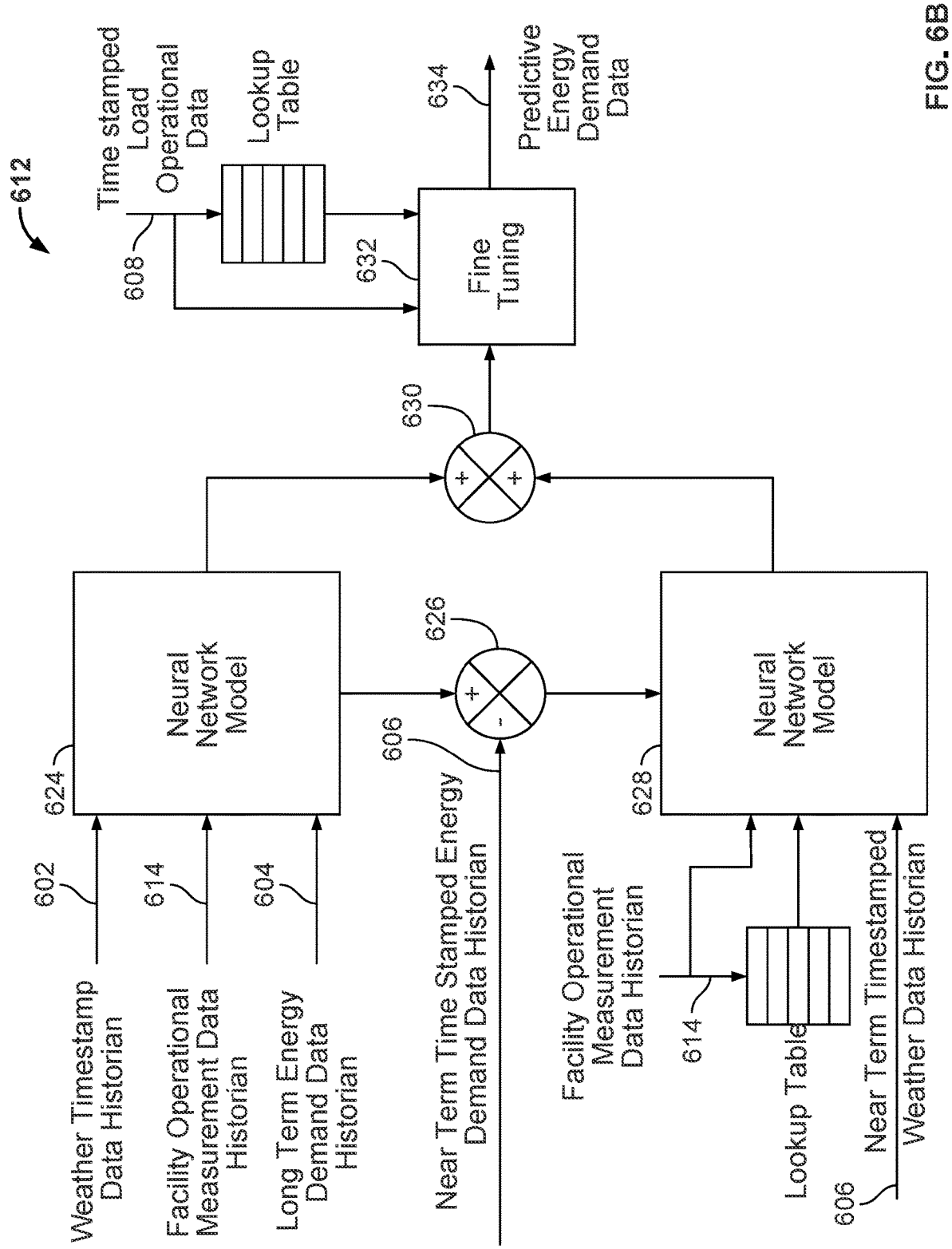

FIGS. 6A-6B illustrate schematic diagrams that describe the PED module 600 of the energy management system 102 of FIG. 2. For example, as shown in FIG. 6A, the PED module 600 includes an energy demand estimator 612 that receives input data 602, 604, 606, 608, and 614, and is operably coupled to a state machine 800. The energy demand estimator 612 uses the inputs 602 through 608 and 614, as well as the input from the state machine 800 to provide energy demand data 622 (that includes predictive energy demand data 616) to the DMR module 700.

In this example, the input data to the energy demand estimator 612 includes timestamped weather data (historical) 602, long term energy demand data (historical) 604, near term energy demand data (historical) 606, timestamped load operational data 608 which is fed with operational instruction data 610, and facility operational measurement data (historical) 614. In this example, the energy demand estimator 612 executes with state machine 800 (shown in FIG. 8 and described previously).

Facility loads in the timestamped load operational data 608 can be classified based on operating behaviors of the remote facility 175. For example, the remote facility 175 can have continuous loads that operate all the time, but some of the continuous loads can have seasonal and daily variations such as lights and air conditioning. The remote facility 175 can also have intermittent loads that can operate predictively or non-predictively. Additional measurement data can be required such as flow limits and pressure and temperature measurements (for example, for choke valve operation).

The facility loads in the timestamped load operational data 608 can also be classified based on operational needs regardless of operational behavior. For example, critical loads 112 must be operational all of the time. Non-critical loads 114 can be turned off for limited time durations. Most non-critical loads 114 and some of critical loads 112 can be prioritized and/or shifted within their classifications.

In an example aspect in which the remote facility 175 is or includes a hydrocarbon processing facility (for example, an unconventional reservoir production site) the facility electrical loads can be obtained from one or more operating components. For example, facility electrical load data can include load data from one or more of, for instance, choke valves, small size chemical injection and hydraulic pumps, flow meters, Remote Terminal Units (RTUs), air conditioning equipment, Emergency Shutdown Devices (ESDs), heat tracing units, air blower, area lights, and uninterruptable power supply (UPS) equipment.

In this example, the energy demand estimator 612 executes with state machine 800 (shown in FIG. 8 and described previously). For example, during IDLE state 802, the state machine 800 waits for a request signal 618 from the DMR module 700. Once the request signal 618 is received, the state machine 800 moves into INIT state 804 to ensure all required up to date information is stored within the input memory. Then, the state machine 800 moves into CALC state 806, which enables the energy demand estimator 612 to perform demand prediction for the next day and to store the data into output memory. Once the computational work is completed, the state machine 800 moves into COMP state 808, and an acknowledgement signal 620 is enabled to indicate that the request is completed. The state machine 800 goes into IDLE state 802 waiting for a new request.

FIG. 6B illustrates a schematic diagram of an example implementation of the energy demand estimator 612. In this example implementation, the energy demand estimator 612 can be divided into two separate prediction models. One of the predication models is a neural network model 624 that includes a low frequency demand prediction model. The neural network model 624 receives input data 602, 604, and 614 and, in some aspects, can be used for a base load demand prediction, which may be replicated multiple times to capture all seasonal behavior. Another of the prediction models is a neural network model 628 that includes a high frequency demand prediction model. The neural network model 628 receives input data 606 and 614 (individually and through a lookup table) and, in some aspects, captures high frequency demand data fluctuations using operational data, timestamps, and the lookup table that outputs an enabled sum of intermittent load data based on operational measurements and equipment settings. The neural network model 628 also receives data that includes a difference in the output of the neural network model 624 and input data 606. As shown in FIG. 6B, an output of both models 624 and 628 are summed in block 630 for a final energy demand prediction, for example, over a subsequent 24 hours without any load shift or curtailing. A fine tuning block 632 performs any curtailing or load shifting requested by the DMR module 700 to provide a predictive energy demand data 634.

Figure 7A:
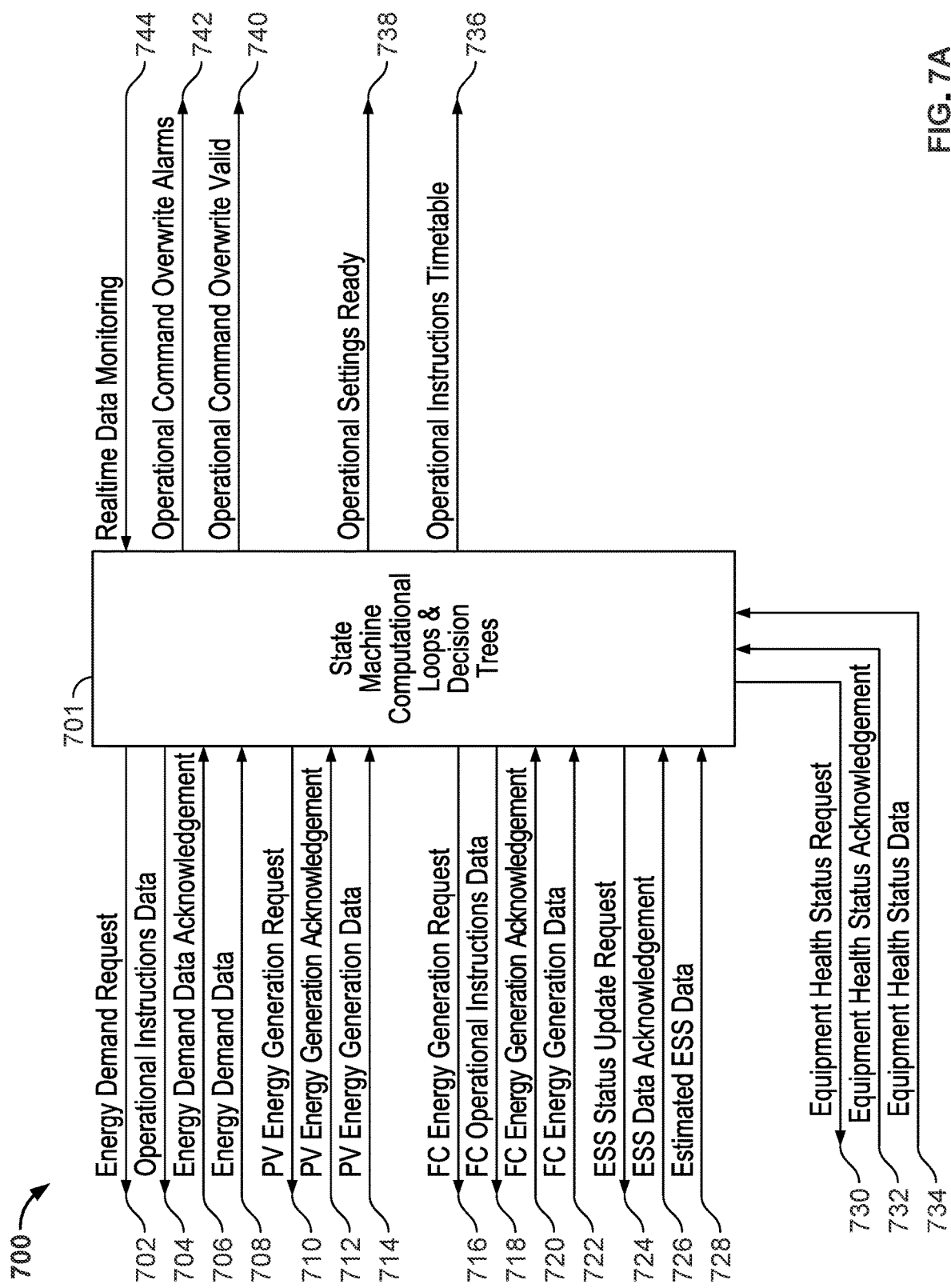
FIGS. 7A-7B illustrate schematic diagrams that describe a decision making and reporting module of the energy management system of FIG. 2 according to the present disclosure.
Figure 7B:
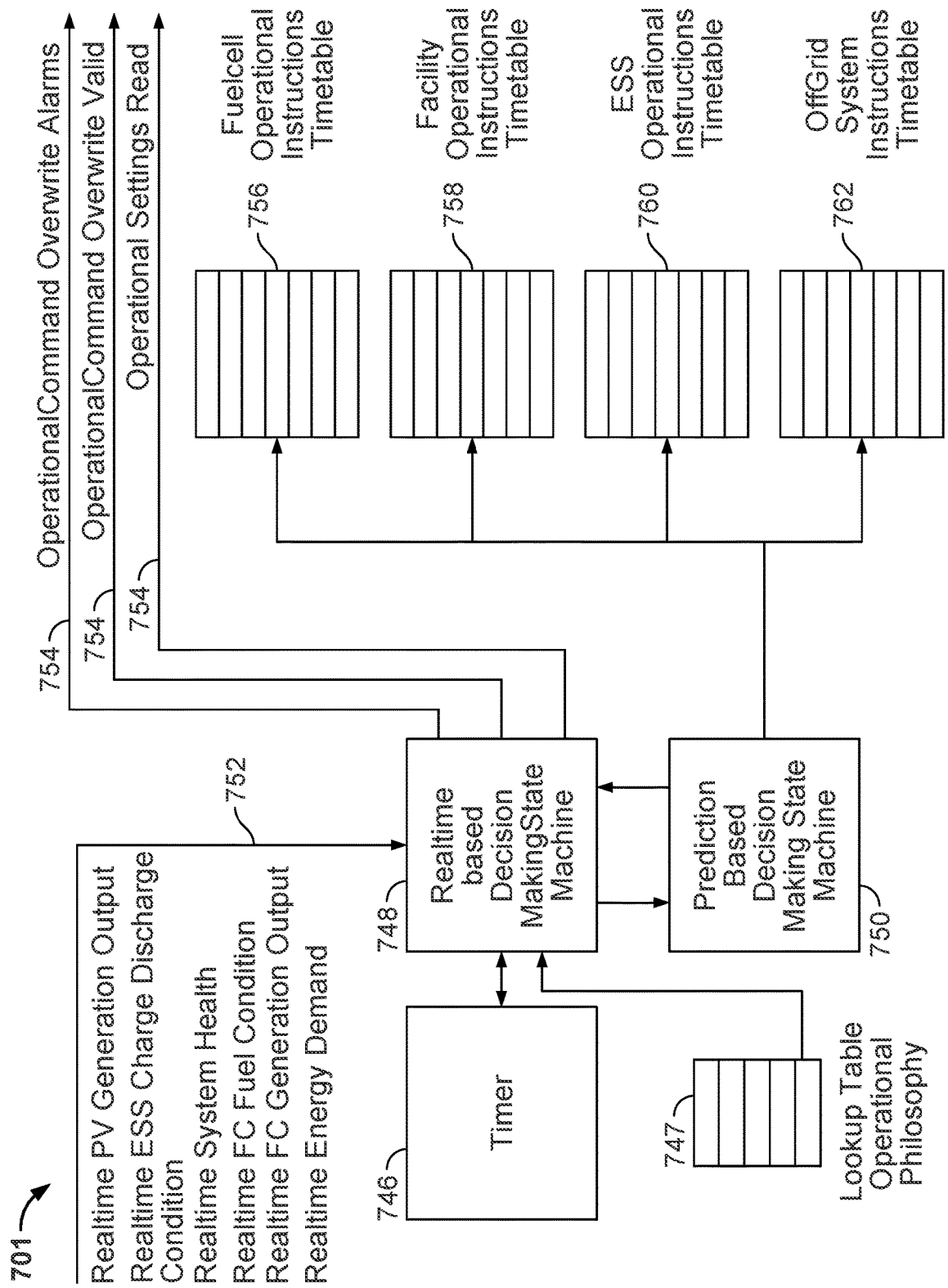

FIGS. 7A-7B illustrate schematic diagrams that describe the DMR module 700 of the energy management system 102 of FIG. 2 according to the present disclosure. In this example implementation, the DMR module 700 includes a state machine 701 that executes computational loops and decision trees, based on multiple requests to which multiple inputs are received, to provide multiple outputs. In this example, the requests (to the modules 300, 400, 500, and 600) include an energy demand request 702, an operational instructions data request 704, a PV energy generation request 710, a fuel cell (FC) energy generation request 716, an FC operational instructions data request 718, an ESS status update request 724, and an equipment health status request 730. An additional input into the state machine 701 includes a real-time data monitoring input 744. The outputs shown in this example implementation (for example, as the status feedback 123 or the communications 127) include operational command overwrites/alarms 742, operational command overwrite valid 740, operational settings ready 738, and operational instructions timetable 736.

In some aspects, the state machine 701 makes a predictive operational decision to mix and match between predicted generated and stored energy and predicted demand for a next day of electrical power operation of the remote facility 175. The state machine 701 can also monitor the energy management system 102 in real time after applying predictive operational decision and make further adjustments (if necessary).

FIG. 7B shows an example implementation of the state machine 701. As shown in this example, the state machine 701 includes a real-time based decision making state machine 748 and a prediction based decision making state machine 750. As shown, a timer 746 controls the operation of the real-time based decision making state machine 748. For example, the timer 746 can control the real-time based decision making state machine 748 on a relatively short period of time such that each major component operational timeline is saved into local memory based on a time stamp interval (for example, 15 min., 30 min, 1 hour, or other time duration).

Real time input data 752 to the real time based decision making state machine 748 includes PV generation output, ESS charge-discharge condition, system health, FC fuel condition, FC generation output, and energy demand. Additionally, in this example implementation, a lookup table 747 provided input to the real-time based decision making state machine 748.

In this example implementation, real time status monitoring and control occurs continuously and this function is performed by the real time based decision making state machine 748. The real-time based decision making state machine 748 sends a start signal to the prediction based decision making state machine 750 to compute and update a predictive operational timeline for one or more components of the off-grid power system 100 for the next time period (for example, the next day). In some aspects, the updating can occur once per time period.

Outputs of the real-time based decision making state machine 748 include operational command data 754, including operational command overwrite (alarms), operational command overwrite (valid, and operational settings (ready). Outputs of the prediction based decision making state machine 750 include operational instructions, including a fuel cell operational instructions timetable 756, a facility operational instructions timetable 758, an ESS operational instructions timetable 760, and an off-grid instructions timetable 762.

Figure 7C:
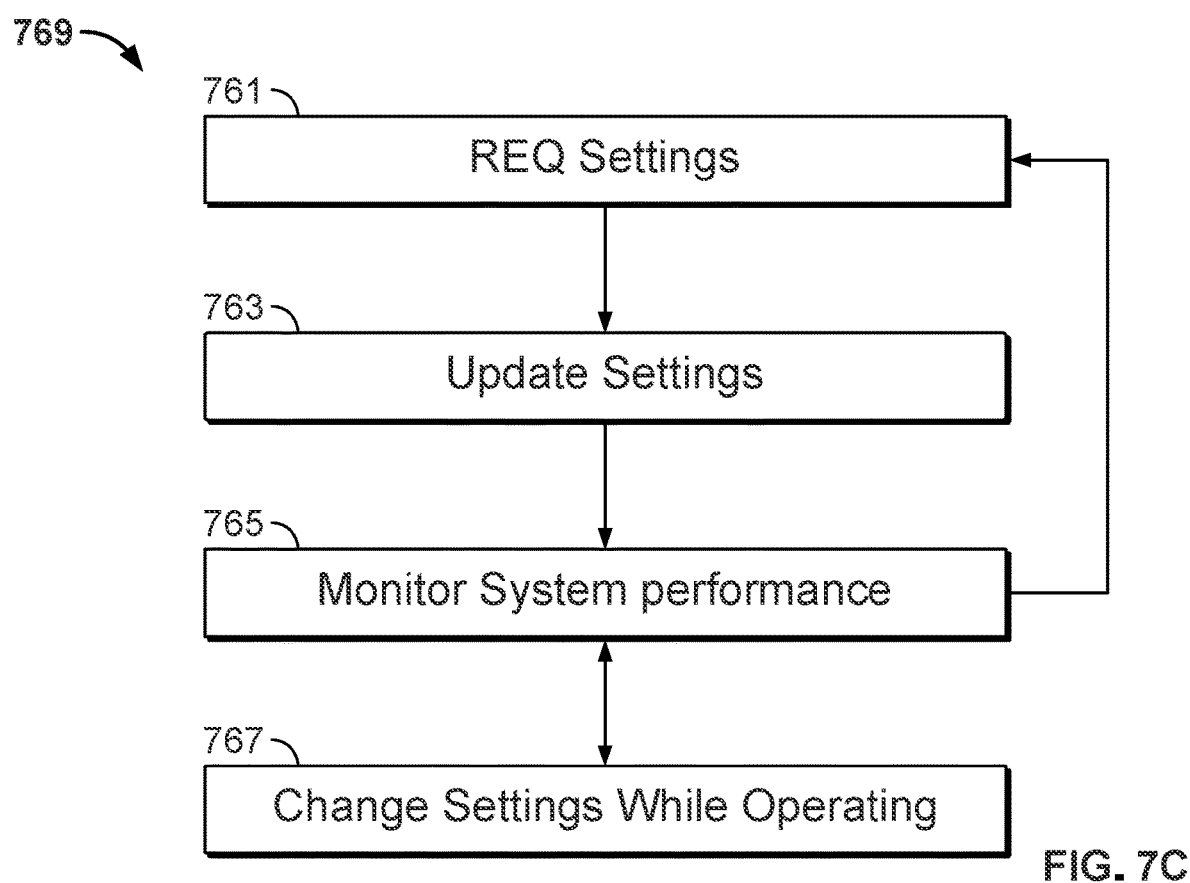
FIG. 7C illustrates a flowchart that describes an example process of the decision making and reporting module of FIGS. 7A-7B according to the present disclosure.

FIG. 7C illustrates an example flow diagram 769 that shows the real-time based decision making state machine state transitions. Step 761 includes a request setting state that initiates the prediction based decision making state machine 750 to start creating a predictive operational timeline. Once the prediction based decision making state machine 750 completes the task and stores all operational timeline into the local memory, step 763 includes an update setting state to read all operational data from a local memory and compile the operational data into a real-time command memory for execution. Step 765 includes a monitor system performance behavior state. Any behavioral change in system performance can modify a setting by transitioning into step 767, which includes a change settings state. Once settings have changed then the process returns to a monitoring system performance state. In some aspects, the predictive computations occurs only once per time period as controlled by the timer 746 (for example, a 24 hour duration).

Figure 7D:
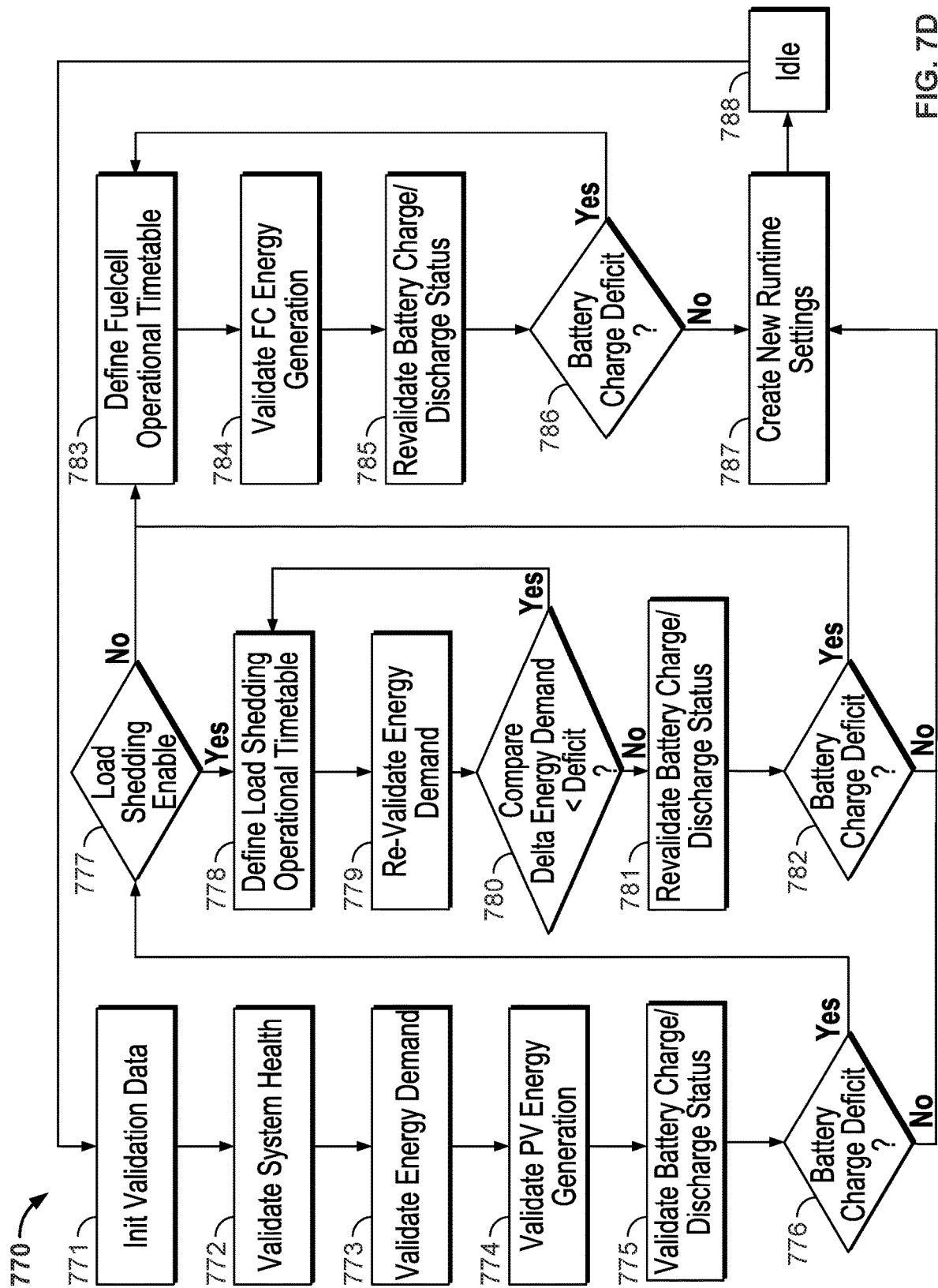
FIG. 7D illustrates a flowchart that describes an example process executed by a portion of a decision making and reporting module of an energy management system according to the present disclosure.

FIG. 7D illustrates a flowchart that describes an example process 770 executed by the prediction based decision making state machine 750 of the DMR module 700. Process 770 may begin at step 771, which includes initialing validation data of the off-grid power system 100. Process 770 can continue at step 772, which includes validating system health of the off-grid power system 100. Process 770 can continue at step 773, which includes validating an energy demand of the off-grid power system 100. Process 770 can continue at step 774, which includes validating a PV solar power cell generation of the off-grid power system 100. Process 770 can continue at step 775, which includes validating an ESS battery charge/discharge status of the off-grid power system 100. Process 770 can continue at step 776, which includes a determination of whether the validated ESS battery charge is deficient. If the determination is yes, then process 770 can continue at step 777, which includes a determination of whether load shedding is enabled for the off-grid power system 100; if the determination in step 776 is no, then the process continues to step 782.

Based on a yes determination in step 777, process 770 can continue from step 777 to step 778, which includes defining a load shedding operational timetable for the off-grid power system 100. Based on a no determination in step 777, process 770 can continue to step 783. Process 770 can continue at step 779, which includes re-validating an energy demand of the off-grid power system 100. Process 770 can continue at step 780, which includes a determination of a difference between the energy demand and the energy generation. If the determination in step 780 is yes (in other words, there is a deficit of energy), then process 770 returns to step 778. If the determination in step 780 is no (there is not a deficit), then process 770 can continue at step 781, which includes re-validating the ESS battery charge-discharge status.

Process 770 can continue at step 782, which includes a determination of whether there is an ESS battery charge deficit. If the determination is no, then process 770 can continue at step 787. If the determination is yes, then process 770 can continue to step 783, which includes defining a fuel cell operation time table. Process 770 can continue at step 784, which includes validating a fuel cell energy generation. Process 770 can continue at step 785, which includes re-validating an ESS battery charge-discharge status. Process 770 can continue at step 786, which includes another determination of whether there is an ESS battery charge deficit. If the determination is yes, then process 770 can revert to step 783, which includes defining a fuel cell operation time table. If the determination is no, then process 770 can continue at step 787, which includes creating new runtime settings. Process 770 can continue at step 788, which is an idle state that then returns to step 771.

Figure 9:
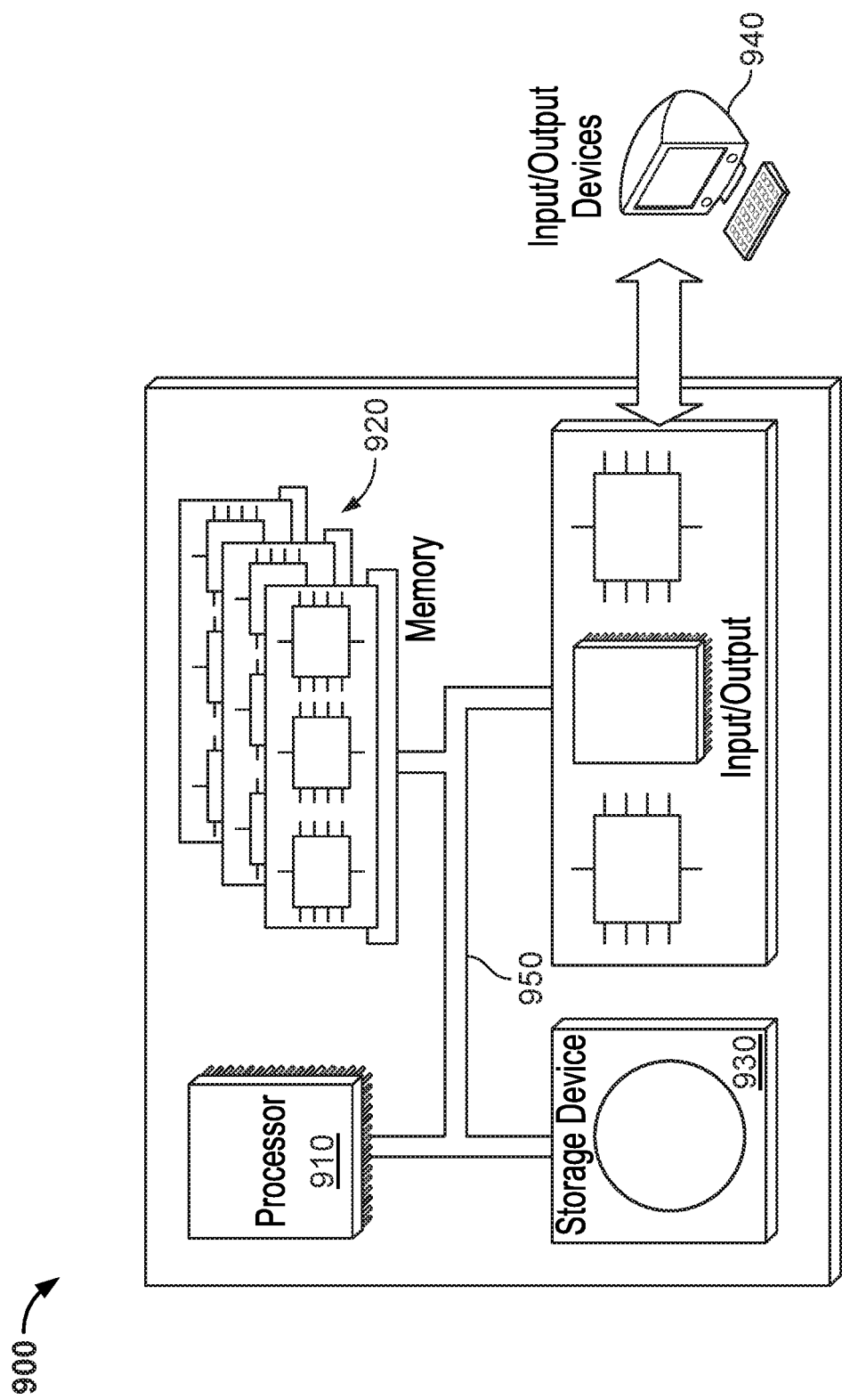
FIG. 9 is a schematic illustration of an example controller (or control system) for an energy management system according to the present disclosure.

FIG. 9 is a schematic illustration of an example controller 900 (or control system) for an energy management system for an off-grid energy system according to the present disclosure. For example, the controller 900 may include or be part of the controller 104 shown in FIG. 1. The controller 900 may also represent all or part of the energy management system 102 shown in FIG. 1. The controller 900 is intended to include various forms of digital computers, such as printed circuit boards (PCB), processors, digital circuitry, or otherwise parts of a control or energy management system. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 900 includes a processor 910, a memory 920, a storage device 930, and an input/output device 940 (for displays, input devices, example, sensors, valves, pumps). Each of the components 910, 920, 930, and 940 are interconnected using a system bus 950. The processor 910 is capable of processing instructions for execution within the controller 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the controller 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the controller 900. In one implementation, the storage device 930 is a computer-readable medium. In various different implementations, the storage device 930 may be a floppy disk device, a hard disk device, an optical disk device, or a tape device.

The input/output device 940 provides input/output operations for the controller 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A computer-implemented method for managing an off-grid power system, the method comprising:
   executing, with one or more hardware processors of an energy management system, a plurality of update requests for an off-grid power system that is communicably coupled to the energy management system, the executing comprising:
      determining, with the one or more hardware processors, an amount of stored energy in one or more energy storage devices of the off-grid power system in response to at least one of the plurality of update requests,
      determining, with the one or more hardware processors, an amount of electrical power generatable by one or more renewable energy power systems of the off-grid power system in response to at least another of the plurality of update requests,
      determining, with the one or more hardware processors, a predicted reliability of at least a portion of the one or more energy storage devices and the one or more renewable energy power systems in response to at least another of the plurality of update requests, and
      determining, with the one or more hardware processors, an amount of electrical power for a remote facility that is electrically coupled to the off-grid power system in response to at least another of the plurality of update requests, the determining the amount of electrical power for the remote facility that is electrically coupled to the off-grid power system comprising:
         determining, with the one or more hardware processors, a low frequency electrical demand load for the remote facility;
         determining, with the one or more hardware processors, a high frequency electrical demand load for the remote facility;
         combining, with the one or more hardware processors, the determined low and high frequency electrical demand loads; and
         providing, with the one or more hardware processors, the at least one control command that is based in part on the combined determined low and high frequency electrical demand loads;
   determining, with the one or more hardware processors, at least one control command for the off-grid power system based on the responses to the plurality of update requests; and
   providing, with the one or more hardware processors, the at least one control command to the off-grid power system to adjust an operation of at least one of the one or more energy storage devices or the one or more renewable energy power systems.

2. The computer-implemented method of claim 1, wherein the determining the amount of stored energy in one or more energy storage devices comprises:
   determining, with the one or more hardware processors, a charge-discharge status of the one or more energy storage devices;
   determining, with the one or more hardware processors, a state-of-charge status of the one or more energy storage devices; and
   providing, with the one or more hardware processors, the at least one control command that is based in part on at least one of the charge-discharge status or the state-of-charge status.

3. The computer-implemented method of claim 1, wherein the determining the amount of electrical power generatable by one or more renewable energy power systems comprises:
   determining, with the one or more hardware processors, an amount of electrical power generatable by at least one photovoltaic (PV) power system of the off-grid power system;
   determining, with the one or more hardware processors, an amount of electrical power generatable by at least one fuel cell assembly of the off-grid power system;
   combining, with the one or more hardware processors, the determined amounts of electrical power by the at least one PV power system and the at least one fuel cell assembly; and
   providing, with the one or more hardware processors, the at least one control command that is based in part on the combined determined amounts of electrical power.

4. The computer-implemented method of claim 3, wherein the at least one control command comprises at least one instruction to operate at least one charger that is electrically coupled to the one or more energy storage devices to charge the one or more energy storage devices with at least one of the amount of electrical power generatable by the at least one PV power system or the amount of electrical power generatable by the at least one fuel cell assembly.

5. The computer-implemented method of claim 3, wherein the determining the predicted reliability of the portion of the one or more energy storage devices and the one or more renewable energy power systems comprises:
   determining, with the one or more hardware processors, an equipment health status of the at least one PV power system;
   determining, with the one or more hardware processors, an equipment health status of the at least one fuel cell assembly; and
   determining, with the one or more hardware processors, an equipment health status of the one or more energy storage devices.

6. The computer implemented method of claim 5, further comprising:
   determining, with the one or more hardware processors, the combined determined amounts of electrical power based at least in part on the determined equipment health statuses.

7. The computer-implemented method of claim 1, further comprising:
   identifying, with the one or more hardware processors, one or more real time settings for the off-grid power system;
   updating, with the one or more hardware processors, one or more stored settings with the identified one or more real time settings for the off-grid power system; and
   changing, with the one or more hardware processors, the one or more real time settings for the off-grid power system based at least in part on the at least one control command.

8. The computer-implemented method of claim 1, wherein the executing the plurality of update requests for the off-grid power system comprises executing, with the one or more hardware processors, at least one state machine to determine: the amount of stored energy in the one or more energy storage devices, the amount of electrical power generatable by the one or more renewable energy power systems, the predicted reliability of the portion of the one or more energy storage devices and the one or more renewable energy power systems, and the amount of electrical power for the remote facility that is electrically coupled to the off-grid power system.

9. An energy management system, comprising:
   one or more memory modules; and
   one or more hardware processors communicably coupled to the one or more memory modules and configured to execute one or more instructions stored on the one or more memory modules to perform operations comprising:
      executing a plurality of update requests for an off-grid power system, the executing comprising:
         determining an amount of stored energy in one or more energy storage devices of the off-grid power system in response to at least one of the plurality of update requests,
         determining an amount of electrical power generatable by one or more renewable energy power systems of the off-grid power system in response to at least another of the plurality of update requests,
         determining a predicted reliability of at least a portion of the one or more energy storage devices and the one or more renewable energy power systems in response to at least another of the plurality of update requests, and
         determining an amount of electrical power for a remote facility that is electrically coupled to the off-grid power system in response to at least another of the plurality of update requests, the determining the amount of electrical power for the remote facility that is electrically coupled to the off-grid power system comprising:
            determining a low frequency electrical demand load for the remote facility;
            determining a high frequency electrical demand load for the remote facility;
            combining the determined low and high frequency electrical demand loads; and
            providing the at least one control command that is based in part on the combined determined low and high frequency electrical demand loads;
      determining at least one control command for the off-grid power system based on the responses to the plurality of update requests; and
      providing the at least one control command to the off-grid power system to adjust an operation of at least one of the one or more energy storage devices or the one or more renewable energy power systems.

10. The energy management system of claim 9, wherein the operation of the determining the amount of stored energy in one or more energy storage devices comprises:
   determining a charge-discharge status of the one or more energy storage devices;
   determining a state-of-charge status of the one or more energy storage devices; and
   providing the at least one control command that is based in part on at least one of the charge-discharge status or the state-of-charge status.

11. The energy management system of claim 9, wherein the operation of the determining the amount of electrical power generatable by one or more renewable energy power systems comprises:
   determining an amount of electrical power generatable by at least one photovoltaic (PV) power system of the off-grid power system;
   determining an amount of electrical power generatable by at least one fuel cell assembly of the off-grid power system;
   combining the determined amounts of electrical power by the at least one PV power system and the at least one fuel cell assembly; and
   providing the at least one control command that is based in part on the combined determined amounts of electrical power.

12. The energy management system of claim 11, wherein the at least one control command comprises at least one instruction to operate at least one charger that is electrically coupled to the one or more energy storage devices to charge the one or more energy storage devices with at least one of the amount of electrical power generatable by the at least one PV power system or the amount of electrical power generatable by the at least one fuel cell assembly.

13. The energy management system of claim 11, wherein the operation of the determining the predicted reliability of the portion of the one or more energy storage devices and the one or more renewable energy power systems comprises:
   determining an equipment health status of the at least one PV power system;

determining an equipment health status of the at least one fuel cell assembly; and determining an equipment health status of the one or more energy storage devices.

14. The energy management system of claim 13, wherein the operations further comprise:

determining the combined determined amounts of electrical power based at least in part on the determined equipment health statuses.

15. The energy management system of claim 9, wherein the operations further comprise:

identifying one or more real time settings for the off-grid power system;

updating one or more stored settings with the identified one or more real time settings for the off-grid power system; and changing the one or more real time settings for the off-grid power system based at least in part on the at least one control command.

16. The energy management system of claim 9, wherein the operation of the executing the plurality of update requests for the off-grid power system comprises executing at least one state machine to determine: the amount of stored energy in the one or more energy storage devices, the amount of electrical power generatable by the one or more renewable energy power systems, the predicted reliability of the portion of the one or more energy storage devices and the one or more renewable energy power systems, and the amount of electrical power for the remote facility that is electrically coupled to the off-grid power system.

17. An apparatus comprising one or more tangible, non-transitory computer readable media configured to store instructions operable, when executed by one or more hardware processors communicably coupled to the media, to perform operations comprising:

executing a plurality of update requests for an off-grid power system, the executing comprising:

determining an amount of stored energy in one or more energy storage devices of the off-grid power system in response to at least one of the plurality of update requests, determining an amount of electrical power generatable by one or more renewable energy power systems of the off-grid power system in response to at least another of the plurality of update requests, determining a predicted reliability of at least a portion of the one or more energy storage devices and the one or more renewable energy power systems in response to at least another of the plurality of update requests, and determining an amount of electrical power for a remote facility that is electrically coupled to the off-grid power system in response to at least another of the plurality of update requests, the determining the amount of electrical power for the remote facility that is electrically coupled to the off-grid power system comprising:

determining a low frequency electrical demand load for the remote facility;

determining a high frequency electrical demand load for the remote facility;

combining the determined low and high frequency electrical demand loads; and providing the at least one control command that is based in part on the combined determined low and high frequency electrical demand loads;

determining at least one control command for the off-grid power system based on the responses to the plurality of update requests; and providing the at least one control command to the off-grid power system to adjust an operation of at least one of the one or more energy storage devices or the one or more renewable energy power systems.

18. The apparatus of claim 17, wherein the operation of the determining the amount of stored energy in one or more energy storage devices comprises:

determining a charge-discharge status of the one or more energy storage devices;

determining a state-of-charge status of the one or more energy storage devices; and providing the at least one control command that is based in part on at least one of the charge-discharge status or the state-of-charge status.

19. The apparatus of claim 17, wherein the operation of the determining the amount of electrical power generatable by one or more renewable energy power systems comprises:

determining an amount of electrical power generatable by at least one photovoltaic (PV) power system of the off-grid power system;

determining an amount of electrical power generatable by at least one fuel cell assembly of the off-grid power system;

combining the determined amounts of electrical power by the at least one PV power system and the at least one fuel cell assembly; and providing the at least one control command that is based in part on the combined determined amounts of electrical power.

20. The apparatus of claim 19, wherein the at least one control command comprises at least one instruction to operate at least one charger that is electrically coupled to the one or more energy storage devices to charge the one or more energy storage devices with at least one of the amount of electrical power generatable by the at least one PV power system or the amount of electrical power generatable by the at least one fuel cell assembly.

21. The apparatus of claim 19, wherein the operation of the determining the predicted reliability of the portion of the one or more energy storage devices and the one or more renewable energy power systems comprises:

determining an equipment health status of the at least one PV power system;

determining an equipment health status of the at least one fuel cell assembly; and determining an equipment health status of the one or more energy storage devices.

22. The apparatus of claim 21, wherein the operations further comprise:

determining the combined determined amounts of electrical power based at least in part on the determined equipment health statuses.

23. The apparatus of claim 17, wherein the operations further comprise:

identifying one or more real time settings for the off-grid power system;

updating one or more stored settings with the identified one or more real time settings for the off-grid power system; and changing the one or more real time settings for the off-grid power system based at least in part on the at least one control command.

24. The apparatus of claim 17, wherein the operation of the executing the plurality of update requests for the off-grid power system comprises executing at least one state machine to determine: the amount of stored energy in the one or more energy storage devices, the amount of electrical power generatable by the one or more renewable energy power systems, the predicted reliability of the portion of the one or more energy storage devices and the one or more renewable energy power systems, and the amount of electrical power for the remote facility that is electrically coupled to the off-grid power system.

25. An energy management system, comprising:
one or more memory modules; and
one or more hardware processors communicably coupled to the one or more memory modules and configured to execute one or more instructions stored on the one or more memory modules to perform operations comprising:
executing a plurality of update requests for an off-grid power system, the executing comprising:
determining an amount of stored energy in one or more energy storage devices of the off-grid power system in response to at least one of the plurality of update requests,
determining an amount of electrical power generatable by one or more renewable energy power systems of the off-grid power system in response to at least another of the plurality of update requests, the determining the amount of electrical power generatable by one or more renewable energy power systems comprising:
determining an amount of electrical power generatable by at least one photovoltaic (PV) power system of the off-grid power system;
determining an amount of electrical power generatable by at least one fuel cell assembly of the off-grid power system;
combining the determined amounts of electrical power by the at least one PV power system and the at least one fuel cell assembly; and
providing the at least one control command that is based in part on the combined determined amounts of electrical power,
determining a predicted reliability of at least a portion of the one or more energy storage devices and the one or more renewable energy power systems in response to at least another of the plurality of update requests, the determining the predicted reliability of the portion of the one or more energy storage devices and the one or more renewable energy power systems comprising:
determining an equipment health status of the at least one PV power system;
determining an equipment health status of the at least one fuel cell assembly; and
determining an equipment health status of the one or more energy storage devices, and
determining an amount of electrical power for a remote facility that is electrically coupled to the off-grid power system in response to at least another of the plurality of update requests;
determining at least one control command for the off-grid power system based on the responses to the plurality of update requests; and
providing the at least one control command to the off-grid power system to adjust an operation of at least one of the one or more energy storage devices or the one or more renewable energy power systems.

26. An energy management system, comprising:
one or more memory modules; and
one or more hardware processors communicably coupled to the one or more memory modules and configured to execute one or more instructions stored on the one or more memory modules to perform operations comprising:
executing a plurality of update requests for an off-grid power system, the executing comprising:
determining an amount of stored energy in one or more energy storage devices of the off-grid power system in response to at least one of the plurality of update requests,
determining an amount of electrical power generatable by one or more renewable energy power systems of the off-grid power system in response to at least another of the plurality of update requests,
determining a predicted reliability of at least a portion of the one or more energy storage devices and the one or more renewable energy power systems in response to at least another of the plurality of update requests, and
determining an amount of electrical power for a remote facility that is electrically coupled to the off-grid power system in response to at least another of the plurality of update requests;
determining at least one control command for the off-grid power system based on the responses to the plurality of update requests;
providing the at least one control command to the off-grid power system to adjust an operation of at least one of the one or more energy storage devices or the one or more renewable energy power systems;
identifying one or more real time settings for the off-grid power system;
updating one or more stored settings with the identified one or more real time settings for the off-grid power system; and
changing the one or more real time settings for the off-grid power system based at least in part on the at least one control command.

27. An energy management system, comprising:
one or more memory modules; and
one or more hardware processors communicably coupled to the one or more memory modules and configured to execute one or more instructions stored on the one or more memory modules to perform operations comprising:
executing a plurality of update requests for an off-grid power system, the executing comprising:
determining an amount of stored energy in one or more energy storage devices of the off-grid power system in response to at least one of the plurality of update requests,
determining an amount of electrical power generatable by one or more renewable energy power systems of the off-grid power system in response to at least another of the plurality of update requests,
determining a predicted reliability of at least a portion of the one or more energy storage devices and the one or more renewable energy power systems in response to at least another of the plurality of update requests, and
determining an amount of electrical power for a remote facility that is electrically coupled to the off-grid power system in response to at least another of the plurality of update requests;

determining at least one control command for the off-grid power system based on the responses to the plurality of update requests; and providing the at least one control command to the off-grid power system to adjust an operation of at least one of the one or more energy storage devices or the one or more renewable energy power systems, wherein the operation of the executing the plurality of update requests for the off-grid power system comprises executing at least one state machine to determine: the amount of stored energy in the one or more energy storage devices, the amount of electrical power generatable by the one or more renewable energy power systems, the predicted reliability of the portion of the one or more energy storage devices and the one or more renewable energy power systems, and the amount of electrical power for the remote facility that is electrically coupled to the off-grid power system.

* * * * *